US008538028B2

(12) United States Patent
Yeap et al.

(10) Patent No.: US 8,538,028 B2
(45) Date of Patent: Sep. 17, 2013

(54) SYSTEM AND METHOD FOR SECURE ELECTRONIC COMMUNICATION SERVICES

(75) Inventors: Tet Hin Yeap, Ottawa (CA); Thomas Anton Goeller, Munich (DE)

(73) Assignee: Toposis Corporation, Ottawa (CA)

( * ) Notice: Subject to any disclaimer, the term of this patent is extended or adjusted under 35 U.S.C. 154(b) by 1194 days.

(21) Appl. No.: 12/153,413

(22) Filed: May 19, 2008

(65) Prior Publication Data

US 2009/0198997 A1 Aug. 6, 2009

Related U.S. Application Data

(63) Continuation-in-part of application No. 11/601,872, filed on Nov. 20, 2006, now abandoned.

(60) Provisional application No. 60/996,240, filed on Nov. 7, 2007.

(30) Foreign Application Priority Data

Nov. 20, 2007 (CA) ................. PCT/CA2007/002061

(51) Int. Cl.
*H04L 9/30* (2006.01)
(52) U.S. Cl.
USPC ............................................ 380/278; 380/30
(58) Field of Classification Search
None
See application file for complete search history.

(56) References Cited

U.S. PATENT DOCUMENTS

| | | | |
|---|---|---|---|
| 5,850,444 A | 12/1998 | Rune | |
| 6,061,448 A | 5/2000 | Smith et al. | |
| 6,154,543 A | 11/2000 | Baltzley | |
| 6,292,895 B1 | 9/2001 | Baltzley | |
| 6,836,765 B1 | 12/2004 | Sussman | |
| 6,886,096 B2 | 4/2005 | Appenzeller et al. | |
| 6,928,167 B1 * | 8/2005 | Maeda et al. | 380/285 |
| 7,003,117 B2 | 2/2006 | Kacker et al. | |
| 7,020,778 B1 | 3/2006 | Miettinen et al. | |
| 7,123,722 B2 | 10/2006 | Filipi-Martin et al. | |
| 2002/0023213 A1 | 2/2002 | Walker et al. | |
| 2003/0147536 A1 * | 8/2003 | Andivahis et al. | 380/277 |
| 2004/0103280 A1 | 5/2004 | Balfanz et al. | |
| 2004/0133520 A1 | 7/2004 | Callas et al. | |

(Continued)

FOREIGN PATENT DOCUMENTS

EP 1357697 10/2003

OTHER PUBLICATIONS

Using LDAP Directories for Management of PKI Processes, Proceedings of Public-Key Infrastructure: First European PKI Workshop: Research and Applications, vol. 3093, Jun. 2004, pp. 126-134.

(Continued)

*Primary Examiner* — Gilberto Barron, Jr.
*Assistant Examiner* — Izunna Okeke
(74) *Attorney, Agent, or Firm* — Thomas Adams

(57) ABSTRACT

A distributed and scalable system for public key registration, distribution and management is provided, comprising a hierarchical key server network providing key address resolution (kDNS) functionality based on a kDNS server hierarchy or a key-DNS server hierarchy and associated protocols. Thus, public-keys of users, such as email recipients, can be searched and retrieved over the internet based on a unique identifier of the user, facilitating secure communication between users in different network domains and organizations.

34 Claims, 15 Drawing Sheets

(56) References Cited

U.S. PATENT DOCUMENTS

| | | | |
|---|---|---|---|
| 2004/0249817 A1* | 12/2004 | Liu et al. | 707/9 |
| 2005/0114664 A1 | 5/2005 | Davin | |
| 2006/0150241 A1 | 7/2006 | Huh et al. | |
| 2007/0022162 A1 | 1/2007 | Thayer et al. | |
| 2007/0124578 A1* | 5/2007 | Paya et al. | 713/155 |

OTHER PUBLICATIONS

Deficiencies in LDAP When Used to Support Public-Key Infrastructure, Communications of the ACM, vol. 46, No. 3, Mar. 2003, pp. 99-104.

Jones et al.: Layering Public Key Distribution Over Secure DNS Using Authenticated Delegation, Computer Security Applications Conference, 21st Annual, Tucson, AZ, USA, Dec. 5-9, 2005, Piscataway, NJ, USA, IEEE, Dec. 5, 2005, pp. 409-418.

* cited by examiner

First Name: _____

Last Name: _____

Email Address: _____

SYSTEM AND METHOD FOR SECURE ELECTRONIC COMMUNICATION SERVICES

CROSS-REFERENCE TO RELATED APPLICATIONS

This application is a continuation-in-part of U.S. patent application Ser. No. 11/601,872, entitled "Open and distributed systems for secure email service" filed 20 Nov. 2006, now abandoned and PCT application no PCT/CA2007/002061, designating the United States, filed Nov. 20, 2007, and claims priority therefrom and from U.S. provisional patent application No. 60/996,240 filed Nov. 7, 2007, entitled "System and method for secure electronic communication services", to the present inventors. These documents are incorporated herein by reference in their entirety.

FIELD OF INVENTION

This invention relates to a system and method for secure electronic communications services, such as email and other IP network communications, based on public-key infrastructure, and more particularly relates to a system, method, and software module for secure electronic communication services which facilitates encryption of email and other communications transmitted between senders and recipients in different organizations and network domains.

BACKGROUND OF THE INVENTION

Email is a popular form of electronic communication between individuals and is widely used for intra- and inter-organizational business communication. Email, however, has a number of longstanding privacy and security shortcomings, which may potentially be exploited on mass scale. Despite existing security limitations, email communication is attractive because of its low cost and very large user base worldwide.

Email uses a store-and-forward messaging system from sender to recipient that is difficult to control or even trace. Internet security technologies, such as Secure Sockets Layer (SSL), that can be applied well to secure point to point transactions, such as used for credit card transactions, or other client-server communications, are not suitable for multi-hop communications, or to secure email communications that involve store and forward messaging from a sender to a recipient across different network domains.

There are a number of known certificate based approaches for securing email and other electronic communications using public-key infrastructure (PKI) and public-key/private-key pairs (public-private-key pairs), but they tend to be employed in limited circumstances, such as within a private data network, or to secure communications between subscribers and their own service provider in a public network. In the latter case the channel is secure, but the information transmitted by the channel is not necessarily encrypted. Typically, known systems require registration and generation of a public-key certificate with a public-private-key pair, which is issued to a subscriber by a trusted certificate authority. A record of the certificate and its association with a particular subscriber is kept in a secure server by the trusted authority, and public-keys are made available on public-key servers.

One of the most widespread methods is based on X.509 certificates and PKI (Public-Key Infrastructure). This type of system is described, for example, in U.S. Pat. No. 6,061,448. However, as described below, digital certificates are typically centrally managed by Certificate Authorities (CA) and implementation of PKI systems is complex and costly. For Enterprises, trying to create, distribute and maintain digital certificates for a large number of users may not be practical.

Furthermore, what is classified as secure email may depend on security requirements, and secure email may refer to one or more of:

message confidentiality (only the sender and recipient are privy to die message),
  message integrity (the message was not tampered with), and
  authentication (the sender and recipient have verified identities).

For example, considering these three aspects or "classifications" of encrypted email, in some instances, when message confidentiality only is provided, an email may not be considered secure because it does not authenticate the sender and does not provide message integrity. Digitally signed email alone, for example, may not be considered secure email because, even though it authenticates the sender and provides message integrity, digitally signed email does not provide message confidentiality and does not authenticate the recipient Trust is important to any business relationship, and unless an email is digitally signed, recipients cannot trust the "From:" field in the email message. Depending on the context and content of a communication, to be qualified as "secure email" all three of message confidentiality, message integrity, and authentication may be required.

A procedure based on X.509 certificates requires that senders and recipients obtain certificates from a trusted certificate authority. A user wanting to receive secure email has to actively address a Certificate Authority, and prove his identity to the Certificate Authority, which typically involves costly and time-consuming procedures—e.g, physical travel, identification by postal services, to obtain a certificate and public-private-key pair. The effort involved with establishing the identity of a person or legal entity to obtain a certificate, may not be considered necessary or desirable in many applications of email communication, and may deter many potential users. Furthermore, unless sender and recipient both belong to an organization with a common PKI infrastructure, interoperability of different systems may be an issue, and many steps have to be performed to enable potential senders to and recipients to exchange encrypted email For example, a user typically has to perform the following steps to be able to receive secured, i.e. encrypted email:

Contact a Certificate Authority to request a certificate and a public/private-key pair.
  Authenticate himself with the Certificate Authority—often, the Certificate Authority requires authentication in person to ensure that the certificate is received by the natural or legal person it is issued for.
  The Certificate Authority issues a certificate for the requestor and signs it with its own private-key. Thus, using the public-key of the Certificate Authority, the integrity of the issued certificate can be proven.
  The Certificate Authority also generates a public/private-key pair and associates it with the certificate of the requestor.
  The private-key is encoded with a password entered by the requestor.
  Certificate, private and public-key are given to the requestor, The private-key is deleted at the Certificate Authority.
  Certificate and public-key are stored on one or several secure servers accessible to the public, or accessible only to a desired user group.

When another user (sender) wants to send a secure email to the above user (recipient) for the first time, the sender must obtain the recipients public-key, for example by one of the following steps:

Find a link to the recipient's public-key associated with his email. Usually, this link is distributed by the recipient to potential communication partners, e.g. in a mail signature. Alternatively, the public-key can be looked up on a PGP key server, as for example described in U.S. Pat. No. 6,836,765. However, since PGP servers synchronize user level entries, this type of system is not believed to scale for billions of secure email users As an alternative to above, an LDAP (Light Weight Directory Accessible Platform) central server could be used to store users' public certificates and be available to senders who want to send secure e-mail to the recipients, as presented in a paper "Using LDAP Directories for Management of PKI Processes" published in Proceedings of Public-key Infrastructure: First European PKI Workshop: Research and Applications, EuroPKI 2004, Volume 3093, Pages 126-134, June 2004. However, this method is typically used in intranet situation due to security weakness in LDAP server, as presented in a paper "Deficiencies In LDAP When Used To Support Public-key Infrastructure" published in Communications of the ACM, Volume 46, Issue 3, Pages 99-104, March 2003. A distributed database system as introduced in U.S. Pat. No. 7,123,722 could also be used to store user's public certificates and be available to senders who want to send secure e-mail to the recipients. This distributed database system has the similar security problem as a LDAP server.

When the sender has determined the recipient's public-key, the user stores the recipient's public-key in a file, and imports the recipient's public-key into the sender's certificate store.

The certificate store may be a certificate store provided by the operating system or an application specific certificate store provided by a dedicated encryption/decryption application or by the mail client application.

The sender may then encrypt the mail with the recipient's public-key in one of the following ways for sending the email to the recipient:

Write the mail body in a file and encrypt this file along with other attachments in an application unrelated to the mail client. Then attach the encrypted file produced by this application to a mail from sender to recipient.

Manually trigger a function of the mail client to encrypt the mail to the recipient using the recipient's public-key.

On sending, the mail client automatically checks the certificate store whether a public-key for the mail recipient is available. If yes, the mail client either offers a choice to the sender—encrypt mail to recipient or not—or encrypts the mail to recipient automatically.

Thus although the use of X.509 certificates and PKI infrastructure can provide for message confidentiality, message integrity, and authentication, ease of use and ease of deployment in email security application remain a challenge. Notably, even after years of development since PKI technology was introduced in the 1980 secure email based on X.509 certificates and PKI is still not a mainstream application today—either within corporations, or particularly among different corporations that entertain business-to-business (B2B) relationships where interoperability of different systems remains an issue.

Consequently, at least for the above reasons, the adoption rate for inter-organizational secure email has been slow, and the majority of emails are still sent in the clear, leaving email subject to eavesdropping, and making it more difficult to fight spam.

Other approaches have attempted to provide alternatives to the use of certificates. For example, a public-key cryptosystem with roaming user capability within a network that allows secure transmission of e-mails between users of the system is described in U.S. Pat. Nos. 6,154,543 and 6,292,895. A client machine generates and stores an encrypted private-key on a central encryption server. A user may then access the encrypted private-key from any client machine located on the network and decrypt it using a pass-phrase, thus giving the user roaming capability, The private-key may then be used to receive and decrypt any email encrypted using the user's public-key. A user can generate a digital message, encrypt it with a client recipient's public-key, and transmit it to the recipient's email server from any client machine on the network. This approach has the limitations that because when a user needs to read an e-mail, he has to log on to the central encryption server to get bis private-key, and thus this approach to secure email system has limitations with respect to scaling for billions of secure email users.

Another technique known as Identity Base Encryption (IBE) scheme was introduced in U.S. Pat. Nos. 6,886,096 and 7,003,117 to simplify the complicated process of dealing with certificates. IBE is a public-key cryptosystem where any string is a valid public-key. In particular, email addresses and dates can be public-keys. A trusted third party, called the Private-key Generator (PKG), generates the corresponding private-keys. The PKG publishes a "master" public-key, and keep the corresponding master private-key in a secret store. Given the master public-key, any party can compute a public-key corresponding to a user by combining the master public-key with the identity value. To obtain a corresponding private-key, the party authorized to use the user's public-key contacts the PKG, which uses the master private-key to generate the private-key for the party. As a result, parties may encrypt messages with no prior distribution of public-keys between individual participants. This is useful in cases where pre-distribution of public and private-keys is inconvenient due to technical restraints. This approach is not entirely satisfactory because the PKG must operate in a highly trusted manner, as it is capable of generating any user's private-key and may therefore decrypt messages without authorization.

Thus, although there are known systems and methods providing message confidentiality, message integrity and authentication for secure email, known systems have limitations or constraints to more widespread adoption, and/or are not readily scalable for large numbers of users. Systems that provide a satisfactory level of security may be seen as onerous or inconvenient for typical individual email users, and may be considered more complex than a typical user needs for many applications, or for inter-organizational communications.

Consequently, there is a need for public-private-key secure systems and methods for facilitating electronic communications such as email for parties communicating over a public data network, particularly when communications are not controlled by a single network operator or entity.

SUMMARY OF THE INVENTION

The present invention seeks to overcome or circumvent above-mentioned limitations of existing email systems and secure electronic communications systems, or at least provide an alternative.

One aspect of the present invention provides a system for public-key management for secure electronic communication services for a plurality of users, comprising, means for registering to a user a unique identifier and attaching to the unique identifier a public-key of a private-public key pair of the user, means for storing unique identifiers and attached public-keys for lookup and retrieval of a public key based on a unique identifier, means for responding to key requests for a public-key for a unique identifier.

Accordingly there is also provided a method for public-key management for secure electronic communication services for a plurality of users, comprising:

registering to a user a unique identifier and attaching a public-key of a private-public key pair of the user, storing the unique identifier and the attached public-key for lookup and retrieval of a public-key based on a unique identifier, responding to key requests for a public-key for a respective unique identifier.

According to another aspect of the present invention there is provided a method for providing secure electronic communication services between a plurality of users, comprising:

registering to a user a unique identifier for electronic communications;

associating with the unique identifier a private-public key pair of the registered user;

making the respective public-key accessible to other users for encryption of communications to be sent to the registered user;

and, providing the registered user with secure access to the private-key for decryption of encrypted communications received from other users.

Making the public-key accessible to other users may comprise storing the unique identifier and the associated public-key on a key server, and providing for look-up and retrieval of the associated public-key based on the unique identifier.

Beneficially making the public-key accessible to other users comprises providing key distribution and management on a distributed key server network, comprising storing the unique identifier and the associated public-key on at least one key server and providing for look-up and retrieval of the associated public-key based on the unique identifier.

Advantageously, the unique identifier and the associated public-key are made accessible via the internet for look-up and retrieval of public keys.

Thus aspects of the present invention provide systems and methods for secure electronic communication services, based on the registering to a user a unique identifier and associating a private-public-key pair of the user with the registered unique identifier. A unique identifier may comprise a communication address or be associated with a communication address, e.g. internet names such as email and VOIP addresses, or other identifier unique to an entity or individual. The registered user or owner of the unique identifier holds the private-key securely, and the respective public-key is made accessible to other users for encryption of communications, which may then be decrypted by the holder of the private-key. The private-key of the owner may also be used e.g. to authenticate the owners identity. The private-public-key pair attached to (or linked/associated with) a unique identifier associated with an internet name or communication address therefore provides for secure communications including message confidentiality, message integrity and authentication of sender and recipient. Other aspects of the invention relate to providing public key management, and associated key registration, and key distribution for secure communications services to ensure public-keys can be accessed widely and efficiently from public networks, preferably through distributed server networks.

One particular application of systems and methods implementing aspects of the invention is secure email. Other applications include other forms of electronic communications such as SMS (Short Message Service) and VOIP (Voice on IP), conventional telephony, and other forms of IP based communications. Other secure network services such as network transaction billing are similarly enabled when the unique identifier having an associated public-private-key pair comprises an account number, name, or other individual identifiers, social insurance number, or biometric data such as fingerprint, voice print, facial image or iris scan.

Advantageously, public-keys are made available to other registered users through key distribution and management on a distributed key server network, for look-up and retrieval of a public-key based on the unique identifier.

Thus, an open and distributed system is provided for widespread and efficient access for key searching and retrieval by multiple users, even in different organizations and domains. Beneficially, identifiers and associated public-keys are made accessible on the internet, e.g. on web accessible servers, for search and retrieval by other users.

The unique identifier may comprises for example an internet name, such as IP address, an email address, a VOIP address, SIP URI, SMS address, and other unique identifiers for electronic communications. Alternatively, unique identifiers may be an account number or username for other network services.

The existence of the private-public-key pair provides for encryption for message confidentiality, and advantageously also provides for other security functionality including verification of message integrity and authentication of sender and recipient.

The step of registering may comprise receiving from a user a registration request for a unique identifier; registering the unique identifier, and triggering generation of a public-private-key pair associated with the unique identifier.

The step of registering may also provides for making available to the registered user a customized software module for a communication client containing the unique identifier, providing secure access to the private-key, and agents for the communication client for public-key look-up and retrieval and for encrypting and decrypting communications.

Conveniently, when the user is using a local communication client, the customized software module takes the form of a plug-in and the method comprises delivering to the user a plug-in for a preferred communication client, the plug-in comprising secure storage of the private-key, and agents for the communication client for public-key look-up and retrieval, and automatically encrypting and decrypting communications.

For use with a web-based communications client, providing the registered user with secure access to the private-key may comprises storing the private-key on a trusted private-key server, and applying an applet to a web based communications client for performing key look-up, message encryption, and message decryption.

Optionally for additional security in transmitting keys, the method comprises signing a retrieved public-key with a private-key of the server before sending to a requestor.

Alternatively, a key request for lookup and retrieval of a public key may require that in addition to the key request containing the unique identifier for which a public key is requested, a unique identifier of die requestor may be required, which itself is associated with a public key. Thus the retrieved public key is signed with the respective public key of the requestor, and requires decryption with the requestor's private key to obtain access.

A registration request from a user may be a request for a new unique identifier, or a registration request from a user for an existing unique identifier. In the latter case, registration may require authenticating the user as the authorized owner or user of the existing identifier before registration of the existing identifier.

Similarly, if for example unauthorized access to a key has been obtained, a registration request may request revocation of an existing key pair and replacement with a new public-private-key pair for the users unique identifier, requiring authentication of the user before issue of the new public-private-key pair. For improved security, the method may comprise periodically generating updated public-private-key pairs and distributing updated public and private-keys, setting appropriate key validity periods.

Yet another aspect of the present invention provides a system for public-key management for secure communications services between a plurality of users, comprising:
a key server storing, for each of a plurality of registered users, a unique identifier and a respective public key of a public-private key pair of a registered user associated with the unique identifier,
the key server operable to respond to key requests for storing for a registered user a unique identifier and a respective public key associated with the unique identifier, and
the key server operable to respond to key requests for look-up and retrieval of a public key associated with a unique identifier.

The system may further comprise a registration server for registering to a user a unique identifier, triggering generation of a public-private key pair, sending a key request for storing the unique identifier and the associated public key on the key server, and providing the registered user with secure access to the associated private key.

Where the key server comprises part of a distributed server network comprising a plurality of key servers, advantageously the system comprises:
a key address resolution server (kDNS server) for receiving key requests for storage and retrieval of a public key associated with a unique identifier, determining, based on the unique identifier, an address of an assigned key server for storing a public key associated with the unique identifier, and directing the key request to the respective assigned key server.

The kDNS functionality, i.e. key address resolution may be provided by a separate kDNS server associated with the Key server (KS) and Registration Server (RS), each of the kDNS, KS and RS being provided by separate network elements, or as part(s) of one network element. Alternatively, a single network element or server may provide a key-DNS service which combines a key server and kDNS functionality.

Beneficially the registration server further provides for triggering generation for a user of a customized software module for a communication client containing the unique identifier, providing secure access to the private-key, and providing communication agents for public-key look-up, and encryption and decryption.

The registration server may itself provide for public-private-key generation, and provide for generation for a user of a customized software module, for example a plug-in mentioned above, for a communication client containing the unique identifier, the private-key and communication agents providing public-key look-up encryption and decryption functionality. Alternatively the registration server may be linked to other network elements providing this functionality, i.e. for key generation, generation of customized software module, or trusted storage of private-keys.

To provide scalability, the system is preferably implemented as a distributed system. For example, both the registration server and/or the key server may be implemented as a server hierarchy, e.g. as distributed server farms, preferably using a hierarchical domain structure. In particular, when the system comprises multiple domains, the key server is preferably implemented including kDNS server means, e.g. what will be referred to as a "kDNS server" separate from a key server, or alternatively using key-DNS combining both key server and k-DNS functionality, for responding to key requests for storage or retrieval of public-keys.

The kDNS server architecture and protocols provide for determining the address of the key server assigned to for storing public keys based on the registered unique identifier, and directing die key request to the assigned key server. Preferably the system is implemented as distributed server organization which has a structure domain tree hierarchy typical of a domain same server (DNS) hierarchy, thus providing scalability and other advantages of known DNS server architectures. Alternatively, a key-DNS server architecture combines key server and k-DNS functionality in an architecture which has flexibility to provide optional de-centralized Registration Server and Key-DNS Servers for specific domains, which may be beneficial in some instances.

The resulting private/public key secure system provides for communicating parties to communicate by way of a public data network without the communications being controlled by a single network operator or service provider. Thus, open and distributed secure electronic communication may be provided without the need for certificates generated by a trusted certificate authority.

More specifically, there is also provided a system for providing secure electronic communication services for a plurality of users, comprising:
a registration server for performing steps of:
  receiving a registration request for registration to a user of a unique identifier,
  registering the unique identifier, and triggering generation of a public-private-key pair associated with the unique identifier,
  and, providing the registered user with secure access to the private-key,
  sending a key request to a key server for storage of the registered unique identifier and the associated public-key
and a key server for performing the steps of:
  storing, for each of a plurality of registered users, a unique identifier and a respective public key of a public-private key pair of a registered user associated with the unique identifier,
  responding to key requests for storing for a registered user a unique identifier and a respective public key associated with the unique identifier, and
  responding to key requests for look-up and retrieval of a public key associated with a unique identifier.

The registration server and key server may be provided by a common network element, for example, for local key service provided by a service provider within a local network, or within a network domain.

Advantageously, the system comprises a distributed server network comprising a plurality of key servers in different network domains,
the system further comprising a kDNS means for receiving key requests for storage or retrieval of a public-key associated with a unique identifier for a user, determining, based on the unique identifier, an address of an assigned key server for public-key storage or retrieval; and directing the key request to the assigned key server.

One or more of the registration server and the key server may implemented as distributed server farms, or as a server network having a hierarchical structure, which may advantageously comprise a hierarchical domain tree structure. For example, a domain tree based hierarchy may comprise one root level domain, a plurality of top level domains, and user domains. The server organization may comprise a plurality of registration servers and key servers within the domains; each domain being registered to only one key server and one registration server, and wherein only top domain key servers and registration servers can delegate respective sub-domain key servers and registration servers.

When such a key server organization is implemented hierarchically, with topmost hierarchies acting as directory servers, which redirect public-key requests to appropriate key servers.

Preferably, a distributed system comprises a kDNS server means for receiving key requests for public-key storage and look-up and determining the address of a key server assigned for storing and look-up of the requested public-key. The kDNS server means for example comprises a kDNS server organization hierarchy which follows a domain name server hierarchy, and maintains name server records (NS) and IP Address records (A). Alternatively and advantageously, both kDNS functionality and key server functionality are provided by a single network element or server, i.e. a key-DNS server. Registration server functionality may also be provided by the same network element.

A distributed kDNS server organization or key-DNS server organization may provide for one or both of recursive and non-recursive searches to determine, for a specified unique identifier, a corresponding key server, and thereby find the public-key associated with the specified unique identifier. A key server typically employs hash table search techniques or other known techniques to locate the public-key.

The key server may be based on a standardized interface, such as DNS or Open PGP.

Beneficially, the registration server is accessible from the internet for self-registration of unique identifiers by users.

Typically, the registration server and key server are linked to one or more communication servers, e.g. email servers, for providing communication services in one or more network domains.

Network domain public-key request services may be offered under a specified port for addresses with the domain, e.g. provided by a domain owner or service provider. A public-key request is first directed to a key server in a first domain, and if unsuccessful, the public key request is then directed to key servers in other domains.

A directory server may respond to a request with a preliminary answer indicating the key server or key server farm where a public-key is stored if an unique identifier exists, and has an associated public-key, and then redirects the request to the indicated key server, or alternatively a request is referred back to a requestor for redirection.

Where the directory servers form a hierarchy, the topmost directory server resolves higher level domains, and the lower directory server levels resolve subdomains and specific addresses.

For additional security, a key request may required to contain the unique identifier for which public-key lookup and retrieval is requested and also the unique identifier of the requestor, the latter also being is associated with a respective public-key, and wherein the key server encrypts the requested public-key with the public-key of the requestor before sending to the requestor, so that the requested public-key can only be retrieved with the requestors private-key.

Optionally, the registration server triggers generation of a certificate along with the public-private key pair, to provide for inclusion of the key in a certificate store for access by other communication services applications.

More specifically other aspects of the invention relate to systems and methods for secure email communications services.

Thus, a yet further aspect of the invention provides a method for secure email communication between a plurality of users, comprising:

receiving a registration request for registration to a user of a unique email address;

registering the unique email address, and triggering generating a public-private-key pair associated with the unique email address;

providing the registered user with secure access to the private-key for use by an email client for encrypting and decrypting communications;

making available on a key server the registered unique email address and the associated public-key for look-up and retrieval by other users for encryption of mail sent to be sent the registered user.

Correspondingly, there is provided a system for secure email communication, comprising a registration server and a key server, the registration server performing steps of:

receiving from a user a registration request for a unique email address, registering the unique identifier, and triggering generation of a public-private-key pair associated with the unique email address, sending a key request to a key server for storing the registered unique email address and the associated public-key for look-up and retrieval by other users for encryption of mail sent to be sent the registered user, and the key server for storing for each registered user a registered unique email address and an associated public-key for lookup and retrieval by other users, and responding to key requests for lookup and retrieval of a public-key associated with a unique identifier.

Conveniently, the registration server provides for generation for the user of a customized software module for use by a communication client and containing the unique email address, secure access to the private-key, and communication agents providing for public-key look-up, encryption and decryption.

The registration server and the key server may be provided by a common network element for local key service within a domain. Advantageously for scalability of the system, one or both of the registration server and the key server are implemented as distributed server farms, and one or both of the registration server and the key server are implemented using a hierarchical server structure.

A distributed server network wherein the registration server and the key server are in different network domains, further comprises a kDNS server means for responding to key requests, determining based on the unique email address an assigned key server for storing of the associated public key, and forwarding the key request to the assigned key server.

Typically, the registration server and the key server are linked to one of more email servers for providing email services in one or more network domains.

The key server may optionally generates a certificate along with the public-private key pair to allow for inclusion of the key in certificate stores for access by other secure communications applications, and key request may also be directed to certificate stores.

A registration request from a user may involve generating a new unique email address, or registration request from a user may be received for an existing email IP address. In the latter case, registration would typically include authenticating the user as the authorized user of the existing email address before registration of the existing email address.

A request may also be made for revocation of an existing key pair and replacement with a new public-private-key pair for the users unique identifier, which would also comprise authentication of the user before issue of the new public-private-key pair. For added security, the method may comprise periodically generating updated public-private-key pairs and distributing updated public and private-keys.

For a local email client, providing the registered user with secure access to the private-key for use by an email client for encrypting and decrypting communications may comprise making available to the registered user a user customized software module for an email client comprising the unique identifier, secure access to the private-key, and agents for the email client for public-key look-up, encrypting and decrypting communications. Conveniently, the software module is delivered as a plug-in for a preferred communication client, the plug-in comprising the private-key, and agents providing functionality for public-key look-up and automatically encrypting and decrypting communications.

For a user employing a server based mail client, the step of providing the registered user with secure access to the private-key comprises storing the private-key on a trusted key server for access by the server based mail client.

In creating the plug in for the user, optionally the registration server causes the plug-in to be delivered in hardware form, or to be delivered to the user on external media such as USB keys, writeable discs or memory cards which hold the private-key in a secure way.

In one form, to facilitate registration, a user may submit registration information submitted through a secure web interface, and making the plug-in available to the user comprises using a users preferred mail client to provide to the user an email containing instructions for retrieving and installing the encrypted private-key and the email plug-in.

In addition to providing message encryption and decryption, authentication of sender and received and message integrity checking, the software module may also provide user feedback on the security status of an email for one or more recipients before sending the email, so that if public keys are not available for all recipients, the recipient list may be modified, or a decision made whether or not to send unencrypted mail.

Also provided is a program module or software module created by a registration server for an email client for a registered user for secure email communication, providing functionality based on a public-key/private-key pair registered to the user, the software module providing instructions for automatic look-up and retrieval of recipient's public-keys from a server based on the recipients email address, and encryption of emails to recipients having an email address associated with a public-key; automatic decryption of incoming mail using the users private key; and optionally, one or more of signing of email content, sender and recipient email identities using sender's private-key to provide message confidentiality and integrity, providing a digital signature, authentication of the sender's email identity using sender's public-key automatically retrieved from key server, and verification of message integrity, and providing user feedback on the security status of an email for one or more recipients before sending of the email.

As noted above a registration request from a user may request registration of new email address for generation of a public-private-key pair. Alternatively, a user may request registration of an existing email address of the user, provided, for example, die user can be authenticated by the registration server as owner of the existing email address. If needed, existing keys for a registered email address may be updated, revoked, or replaced with new keys, e.g. if security is compromised when a private-key becomes known to an unauthorized party, or as part of a regular security update providing updating and distribution of updated keys on periodic basis.

The system and method is compatible with use of a local mail client or web based mail client. The user may be provided with access to customized software module, which may for example be conveniently be delivered to the user as a plug-in for a preferred communication client, the plug-in comprising their private-key pair, and agents providing functionality for public-key look-up and automatically encrypting and decrypting communications. When employing a server based mail client, the registered user is provided with secure access to the private-key comprises storing the private-key on a trusted private-key server for access by the server based mail client. As an alternative to a software module, the registration server creating the plug in for the user, causes the plug-in to be delivered in hardware form, or to be delivered to the user on external media such as USB keys, writeable discs or memory cards which hold the private-key in a secure way.

Preferably registration servers are accessible on the internet, so that a registration request from a user may conveniently be received from the user registration information submitted through a secure web interface. Conveniently, registration of a unique identifier, e.g. an email address, may be accomplished by a system including a registration server, that allows the user/subscriber visit a web site, fill in a registration form with a limited amount of personal information, and either obtain and register a new unique email address The plug in may be made available to the user, for example, using a users preferred mail client to provide to the users an email containing instructions for retrieving and installing the encrypted private-key and the email plug-in.

The principle here is that if the user can receive mat the email, the user must be the owner of that email address, and the system is therefore willing to issue a private and public-key pair certifying that the key belongs to the registered email address.

The email plug-in preferably also provides additional functionality based on the existence of public and private-keys. For example, the plug-in preferably provides for automatic look-up and retrieval of a recipient's public-key from a key server, encryption of mail to recipients whose email address is associated with a public-key, and signing of email content and sender and recipient email identities using sender's private-key to provide message confidentiality and integrity; providing a digital signature, authentication of the sender's email identity using sender's public-key automatically retrieved from key server, and verification of message integrity, e.g. using a checksum or other known methods.

Thus there is provided an open and distributed system and method for encrypting email communications, without the need for Certificates, which helps to overcome the problems associated with email security applications based on X.509 certificates and PKI (Public-key Infrastructure). More generally this approach is applicable to other electronic communications.

Aspects of the present invention provide systems and methods that allow a user avoid the need for obtaining a certificate, and relatively simply register a unique email address, SIP address or other unique identifier, obtain a public-private-key pair, and access to appropriate software to perform automatic encryption of outgoing communications and decryption of incoming communications, plus provide additional security functionality based on the existence of public- and private-keys.

For effective implementation, a distributed registration, key distribution and management system advantageously provides for rapid key look-up and retrieval based on a k-DNS server architecture and protocols.

Thus there is provided a scalable, open and distributed system to allow arbitrary users in different organizations and computer domains to communicate securely via email, and more particularly to facilitate the application of web-based public-key infrastructure to enable transmission of e-mail and other communications securely over internet, and without the need for certificates.

BRIEF DESCRIPTION OF THE DRAWINGS

Embodiments of the invention will now be described by way of example only, and with reference to the accompanying drawings, in which:

FIG. 2 shows a schematic of a sample form with basic user information to register a secure email account according to an embodiment of the invention;

DETAILED DESCRIPTION OF THE PREFERRED EMBODIMENTS

Figure 1:
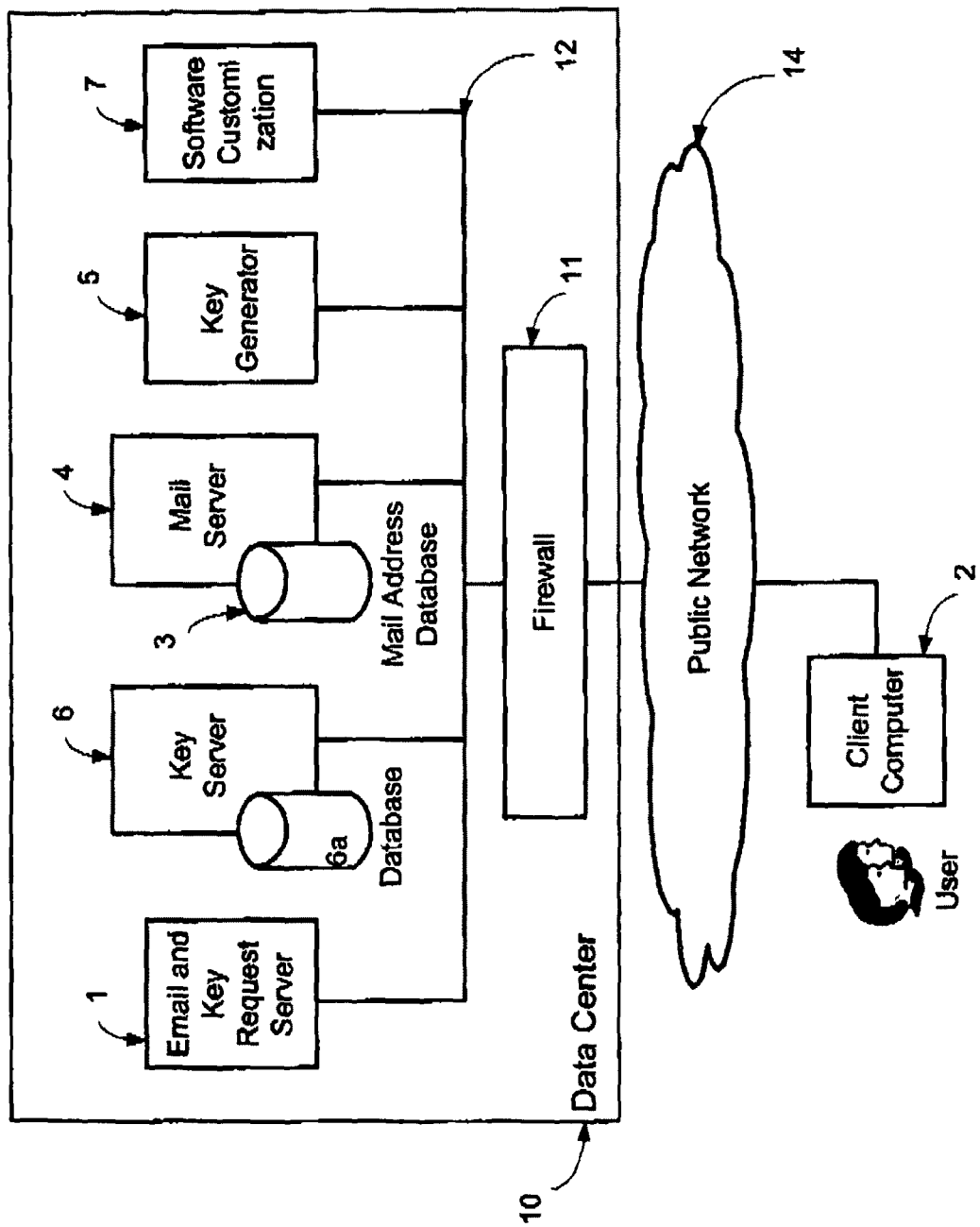
FIG. 1 shows a schematic representation of a system for secure communications in a telecommunications network comprising system components in a Data Center offering Secure Email Services according to an embodiment of the invention.

A system and method for secure electronic communication according to a first embodiment of the invention, and as illustrated in FIG. 1, provides for secure email communication.

In summary, the system comprises a registration server that provides for a user to obtain and register a unique identifier, in this case, an email address, preferably of the users choice, and a private-key/public-key pair (public-private key pair), which is generated upon request from the registration server. The registration server also triggers generation a customized software module, in the form of a plug-in for a mail client, and stores the respective unique identifier and the associated public-key on a key server. The public key is made available on the key server for look-up and retrieval by other users, based on the unique identifier. The user receives the public-private key pair as part of a plug-in for a preferred email client which enables the user to hold the private key securely and provides functionality for encryption of emails to be sent to other recipients, and decryption of received emails, and may include other functionality based on availability of public-private-key pairs, including verification/authentication of the sender and recipient, message integrity checks, and digital signature.

Figure 2:
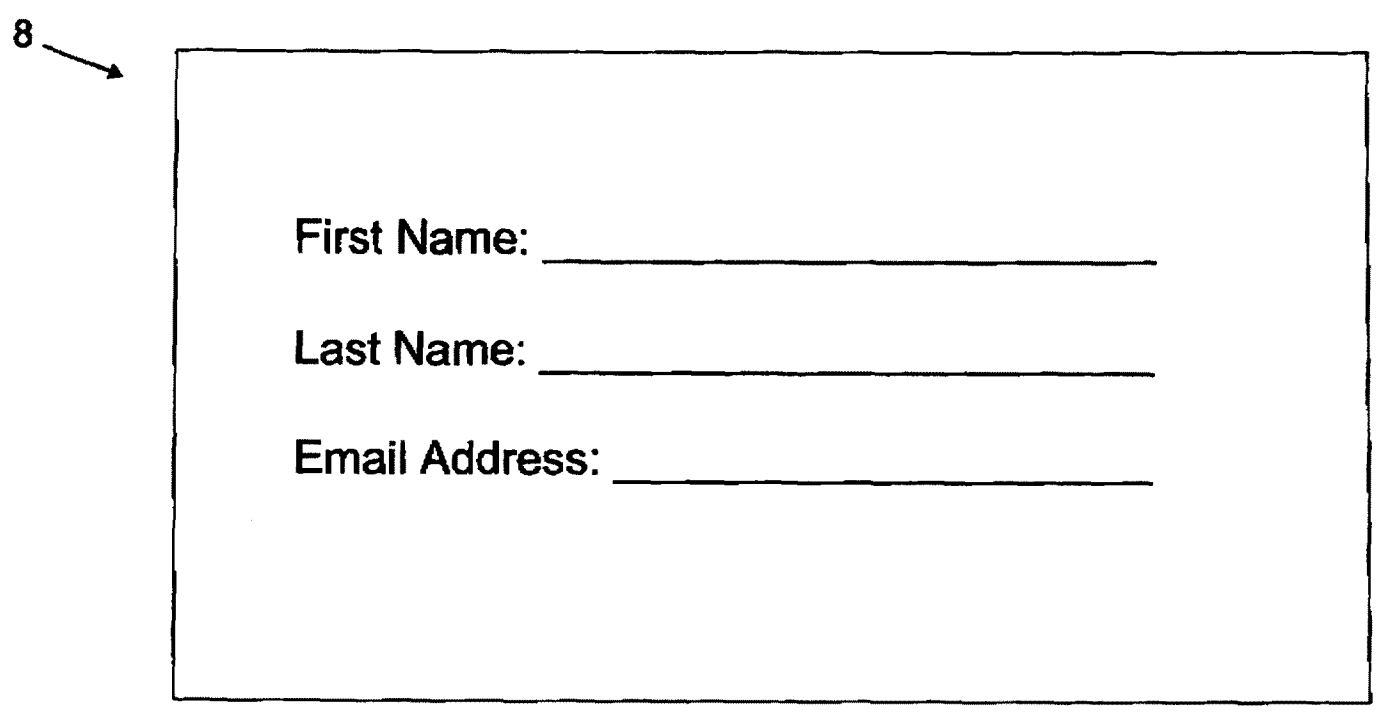

Referring now to FIG. 1, the system comprises a registration server in the form of Web Accessible Server 1. In typical configuration, the Web Accessible Server 1 is located in a Data Center 20 and connected to an internal private network 12 protected by a firewall 11. A user who wants to participate in the service for secure email communication connects from a Web client running in Client Computer 2 to the Server 1. Server 1 will offer the user a form 8, for example as shown in FIG. 2, to enter a desired email address under a domain operated by the service provider.

Once the user has entered her request for an address, the server checks the desired email address against a Database 3 of existing email addresses. If the email does not exist yet, the user is requested to eater a password for accessing mail and for accessing the public and the private-keys to be generated. The Server 1 enters the email address into the Database 3 of the Mail Server 4, and sends a request to a Key Generator 5 which generates a private-key/public-key pair. Otherwise, an exception is generated saying that the email address exists and the request to add the email address to the database may be illegal. The case for users with legitimate existing e-mail address already in the Mail Server 4 will be described further below.

The email address and the public-key are then entered and stored on Key Server 6. On the Key Server 6, the email address 24 of the user is stored along with the attached public-key 25 as shown schematically for user Y in FIG. 3. The public-key is signed with the private-key of the key server to make sure that the public-key can checked by the mail client plug-in software 22 of the user for the key authenticity.

The email address, the associated public key and the private-key are also used to generate a custom software installation package by a Software Customization module 7. Where the user is using a local email client, the custom software installation package generated will then be offered to the user for download to the Client Computer 2. After downloading the software package, the user will be asked to execute the software installation package.

The software installation package will install at least the following components on the Client Computer 2:

- A mail client plug-in 22 and/or 33 whose functionality will be described further below, and comprises at least public-key look-up, and modules for encryption and sending encrypted email and receiving and decrypting received mail.
- A public/private-key pair associated with the email address the user has obtained. Access to this key pair requires entry of a password. Initially this is the password entered by the user during the secure email address registration.

Figure 3:
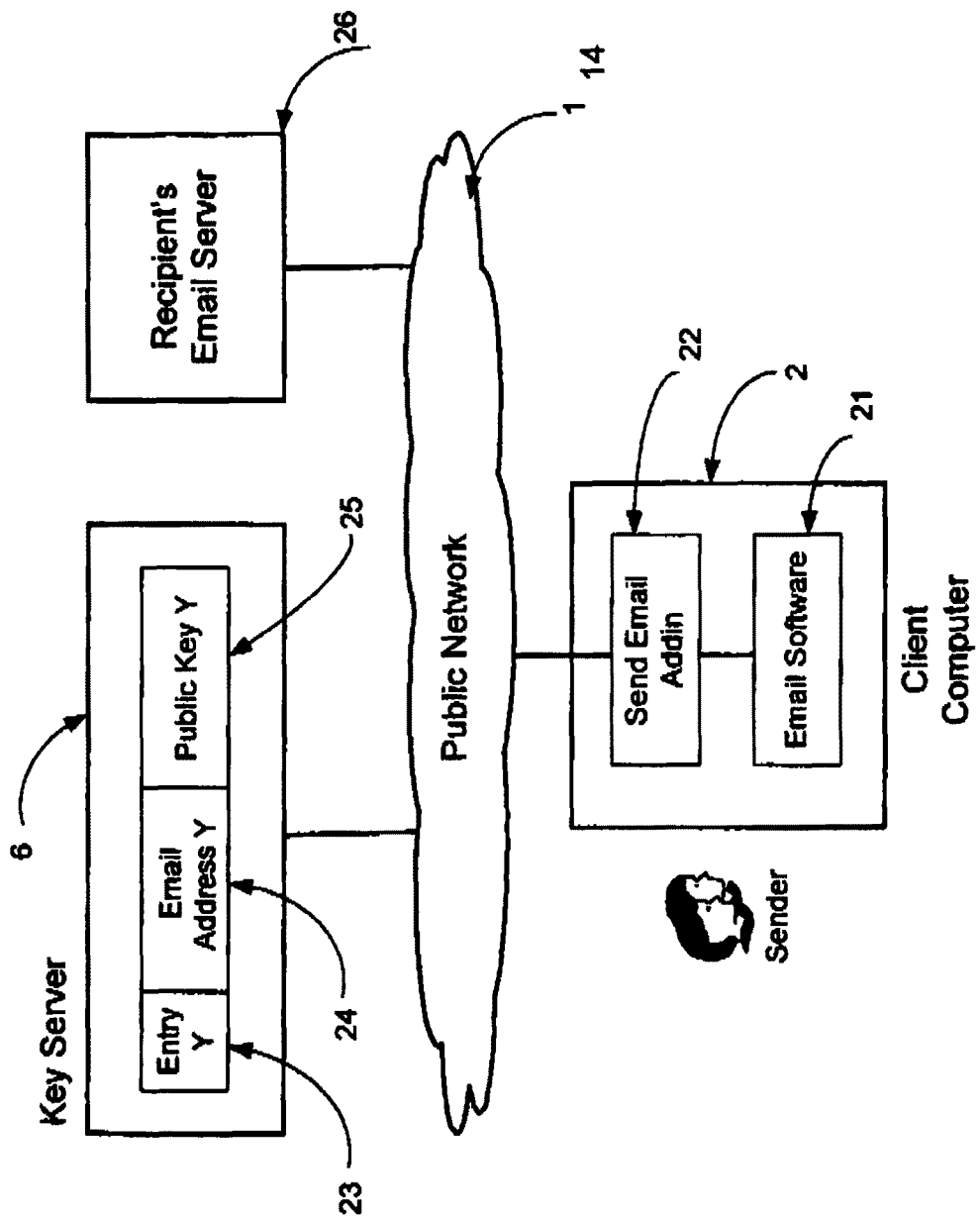
FIG. 3 shows a schematic representation of a telecommunications network comprising a system for transmission of secure email in a public network according to an embodiment of the invention.

Referring to FIG. 3, when the user (i.e. as sender) wants to send out an email to another user (recipient) from the Client Computer 2—the case when we have several recipients is analogous—the sender composes the mail in the client computer 2 using the Email Software 21, as usual. When the sender presses the "Send" button, the Send Mail Plug-in (Add-in) 22 will do the following:

- Contact the Key Server 6 to find out whether a key is associated with die recipient's email address 24.
- If no, the user may be prompted to decide whether to send the email unencrypted, or cancel sending, or the email may be sent unencrypted by default.
- If yes, the Send Mail Plug-in 22 retrieves the recipient's Public-key 25 from the Key Server 6. The Send Mail Plug-in 22 encrypts the message to the recipient with the recipient's Public-key 25. Then the email will be sent to the recipient's Email Server 26.

Figure 4:
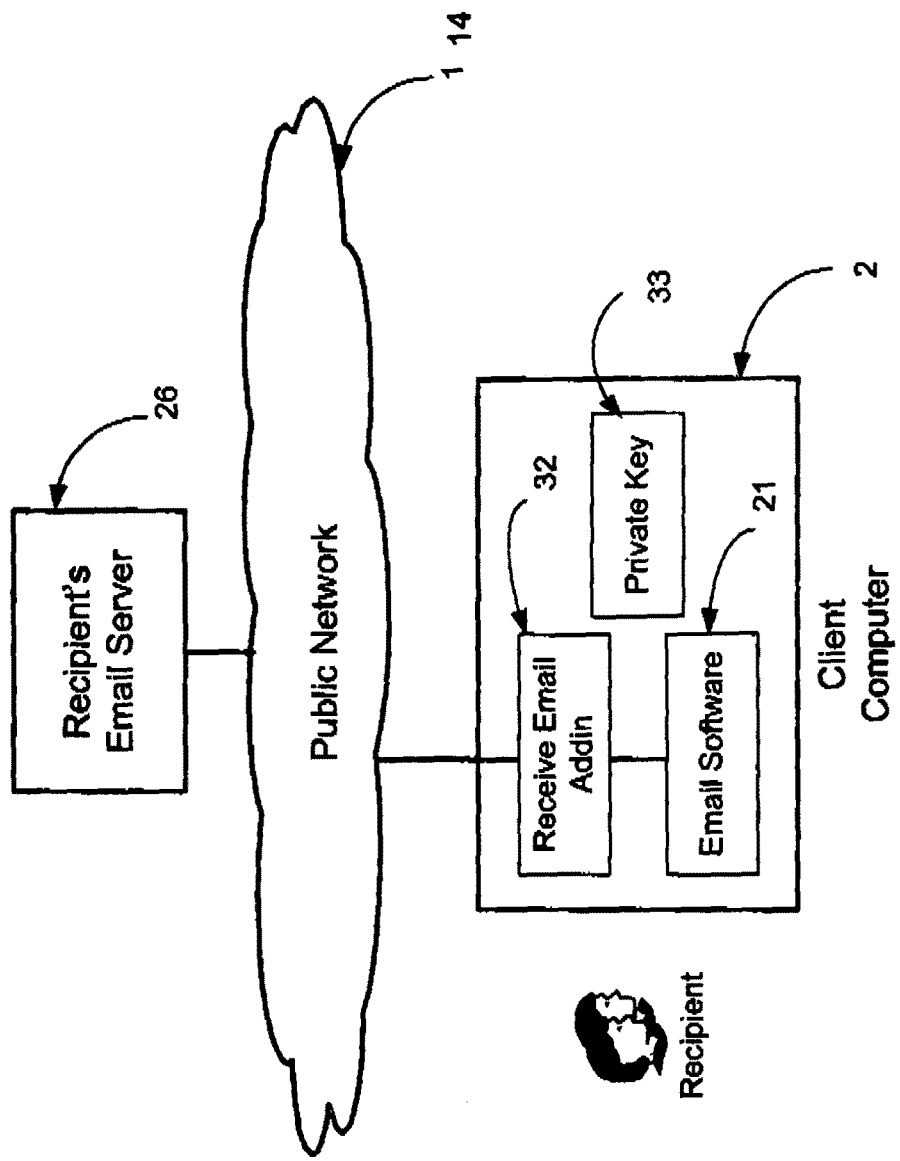
FIG. 4 shows a schematic representation of a telecommunications network comprising a system for receiving secure email in a public network according to an embodiment of the invention.

Referring to FIG. 4 when the user receives an encrypted email from the Recipient's Email Server 26, the Receive Mail Plug-in (Add-in) 32 will do the following:

- Ask the user for the password to access the Private-key 33. It is up to the security policy whether this has to happen every time when a mail is to be decrypted, or only the first time after the Email Client Software 21 has started each session.
- Decrypt the received mail with the user's Private-key 33.

The Name Entry 23 associated with email address 24 and public key 25 in the database of Key Server 6 is optional, It is mainly used for maintenance and search purposes.

When a user has an existing email address, the registration server 1 may allow a user to register and add secure communication functionality to an existing email address, along with a private/public-key pair which is generated upon request of secure e-mail service. It could be applied to email addresses under the domain operated by the same or different service provider if desired. For security purposes, a user would be required to be authenticated as owner of the existing email address before registration for secure email.

Figure 5:
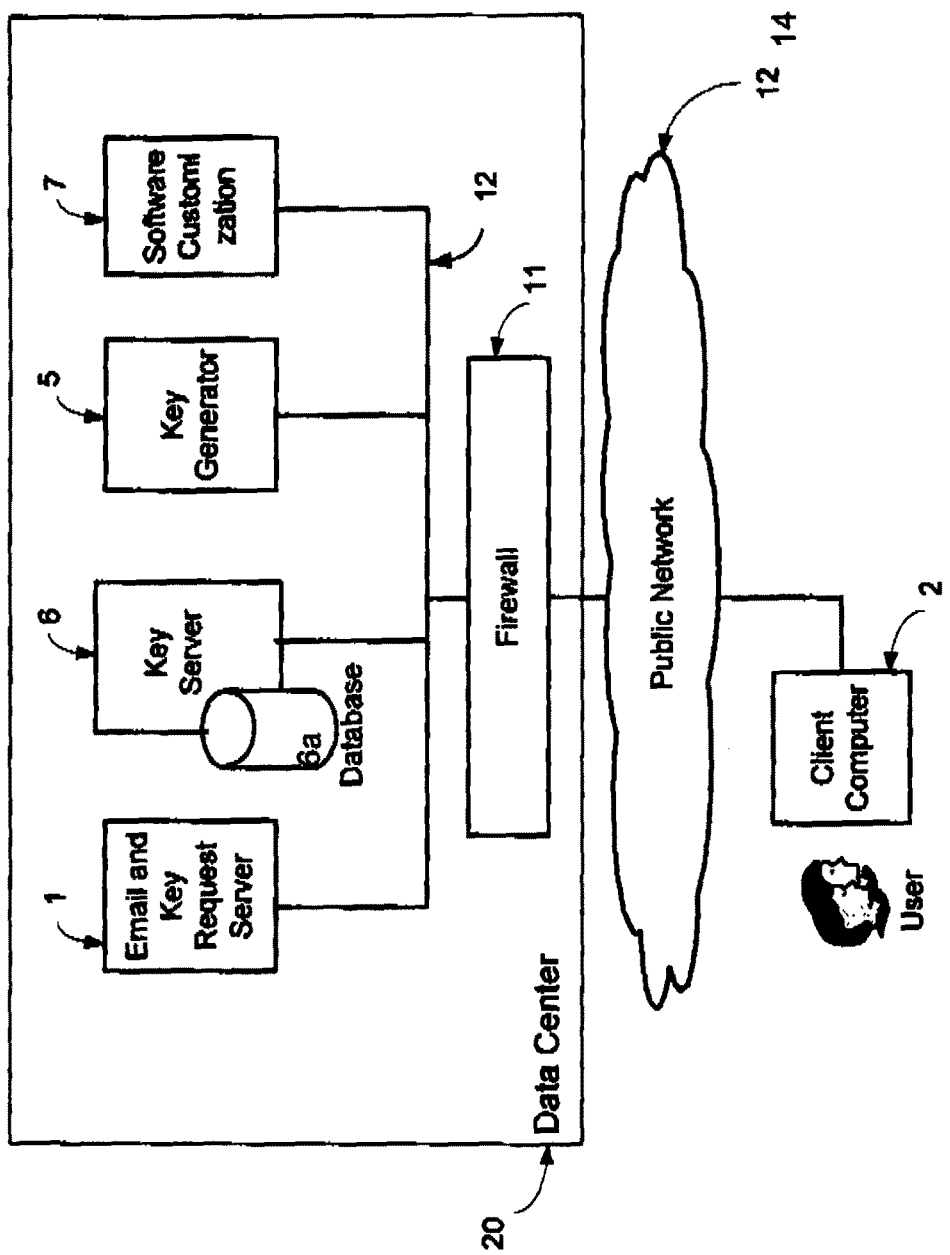
FIG. 5 shows a schematic representation of a system for performing registration of a new public-key with key servers according to another embodiment of the invention.
Figure 6:
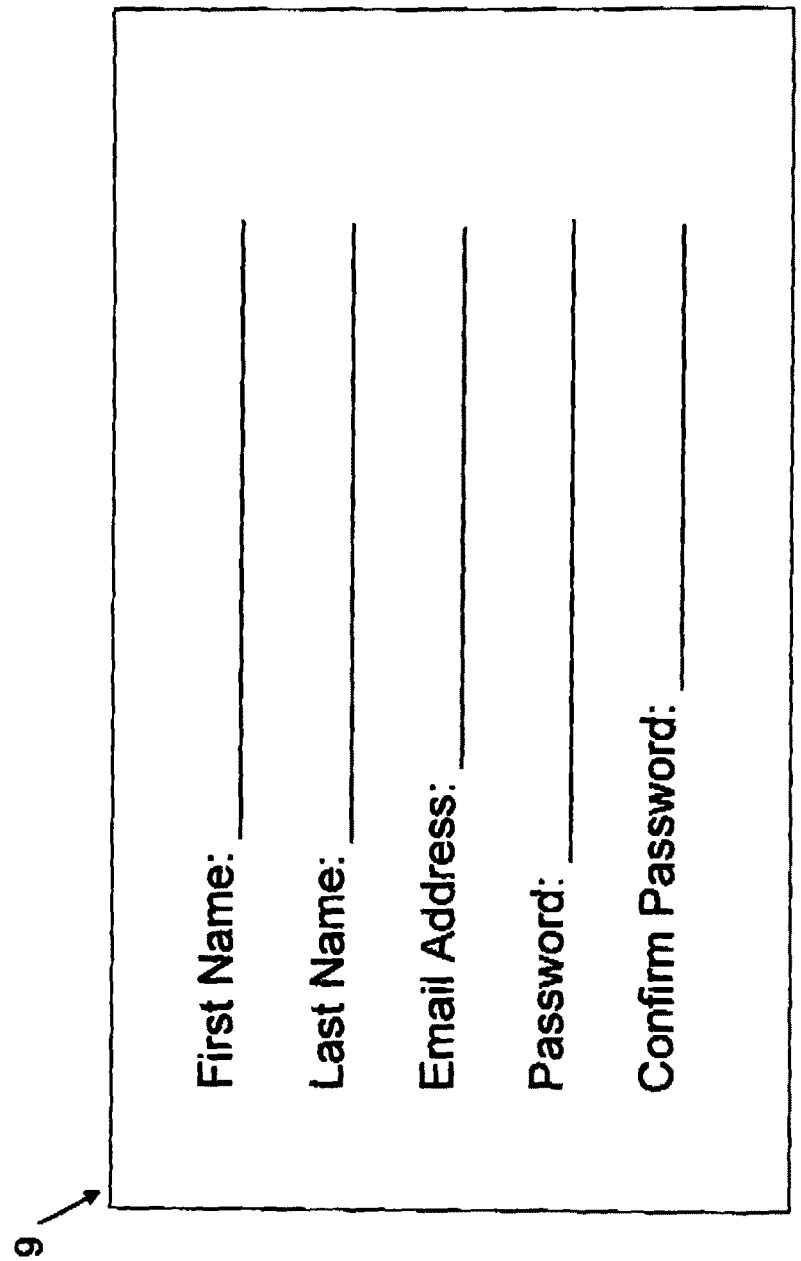
FIG. 6 shows a schematic of a sample form with basic user information to register an existing email account for secure email according to an embodiment of the invention.

Thus, referring now to FIG. 5, a user with an existing email who wants to participate in the service connects from a Web client running in Client Computer 2 to the Server 1. Server 1 will offer the user a form 9 as shown in FIG. 6, to enter the user's first name, last name, existing email address, and the password for accessing the mails and the public and the private-keys to be generated. The confirmation password is also entered to make sure that the password entered is correct.

Once the user has entered the requested information, the Server 1 sends a request to a Key Generator 5 which generates a private-key/public-key pair and an activation code for the desired email address. The email address, the public-key and the activation code are then entered on Key Server 6. On the Key Server 6, the email address of the user is stored along with die associated public-key. Preferably, the public-key will be signed with the private-key of the key server to make sure that the public-key could be checked by the mail client plug-in software 22 for the key authenticity. At this stage, the entry containing the email address along with the associated public-key is still inactive. It will remain inactive until the user has activated it.

The email address, the public-key, the private-key and activation code are used to generate a custom software installation package by a Software Customization module 7. The custom software installation package generated will then be offered to the user for download to the Client Computer 2. After downloading the software package, the user will be asked to execute the software installation package.

To avoid any illegal email address entry and its associated public-key in Key Server 6, the activation code during key generation generated earlier will be sent to the user by email to his registered email address. Upon receiving the email, the user enters the activation code to activate software installation package. Upon activation, the software installation package will install at least the public/private-key pair associated with the email address on the Client Computer 2. Access to this key pair requires entry of a password. Initially this is the password entered by the user during the secure email service registration. The plug-in software 22 generates a hash code from the activation code after it has been activated and sends the hash code and the e-mail address to Key Server 6. Key Server 6 compares the hash code of the activation code stored in the database associated with the e-mail address with the hash code received. If these two hash codes are identical, Key Server 6 will activate the user's email address entry and the associated public-key.

The same processes described above are applied when the user (sender) wants to send out an email to another user (recipient) from the Client Computer 2 or when the above user receives an encrypted email from the Recipient's email server.

Enhancements to Plug-in

Figure 9:
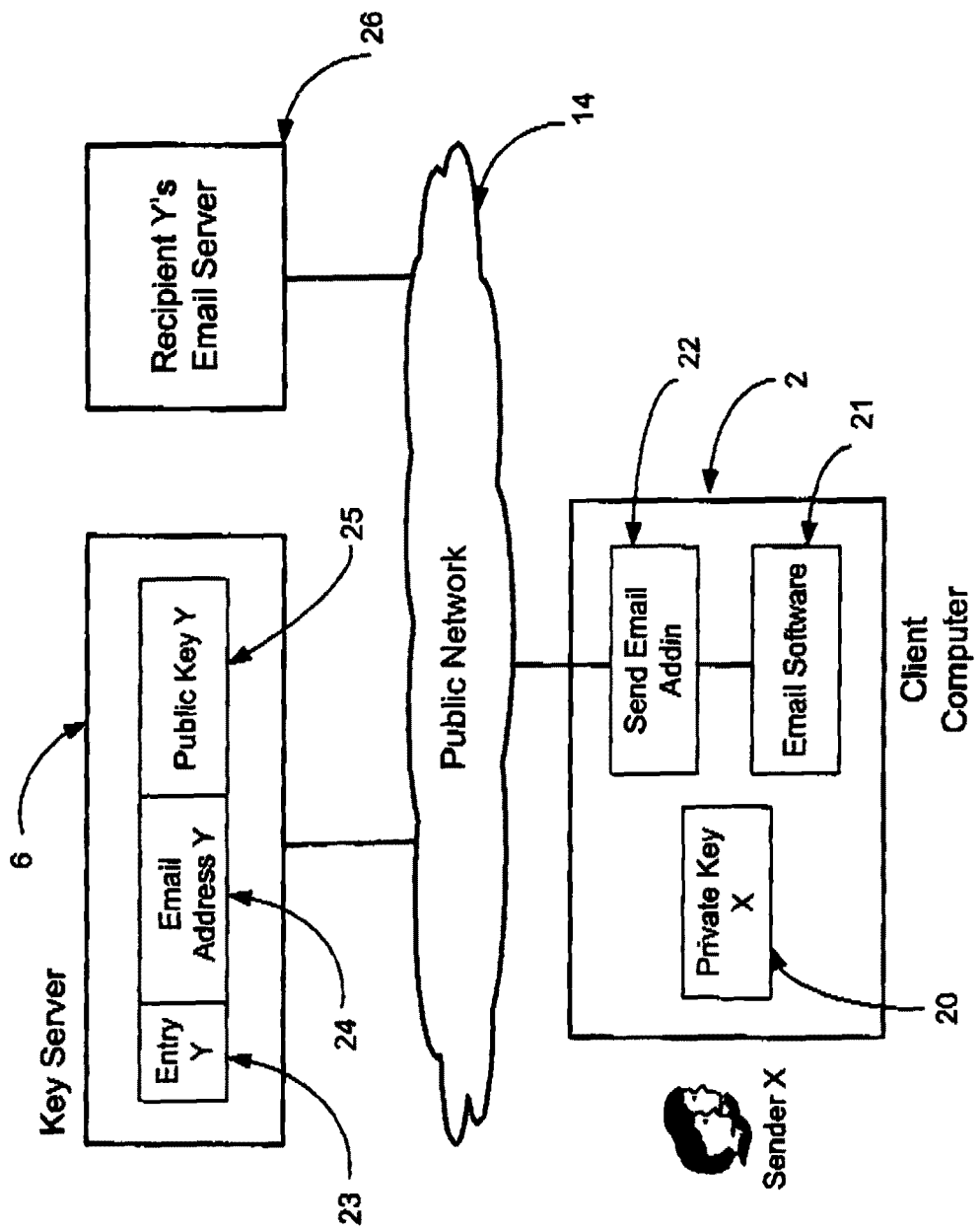
FIG. 9 shows a schematic representation of a system and method for signing an email in a public network according to another embodiment of the invention.

As described above with respect to the first embodiment of the invention, the plug-in 22, 32 provides for public-key look-up, encryption of mail to be sent, and decryption of received mail. In another embodiment, enhancements to the plug-in are provided that allow a recipient of the email to authenticate whether the sender is the true person possessing the email address registered to the Key Server system. Referring to FIG. 9, when a user acting as sender X, wants to send out an email to another user, recipient Y, from the Client Computer 2, the sender composes the mail in the client computer 2 using the Email Software 21. When the sender presses the "Send" button, Send Mail module of the Plug-in 22 will do the following:

- Contact the Key Server 6 to find out whether a key is associated with the recipient's email address 24.
- If no, the email may be sent unencrypted or the sender may be asked whether the mail shall be sent unencrypted to the recipients) for whom no public-key could be retrieved.
- If yes, the Send Mail module of Plug-in 22 will retrieve the recipient's Public-key from the Key Server 6. The Send Mail Plug-in 22 will encrypt the message to the recipient with the recipient's Public-key 25. Then the email will be sent to the recipient's Email Server 26.

If sender wishes that the e-mail's sender and message integrity could be verifiable by the recipient, the Send Mail Plug-in 22 will retrieve the sender's private-key 20 and use the private-key 20 to sign a message containing both the sender's e-mail address and recipient e-mail address. As an option, the plug-in 22 may provide for message integrity, i.e. the message may also contain the checksum of the email content generate by the email client to ensure email integrity. The signed message is sent as part of the encrypted e-mail or is sent in the clear with the e-mail if the e-mail is sent unencrypted.

Figure 10:
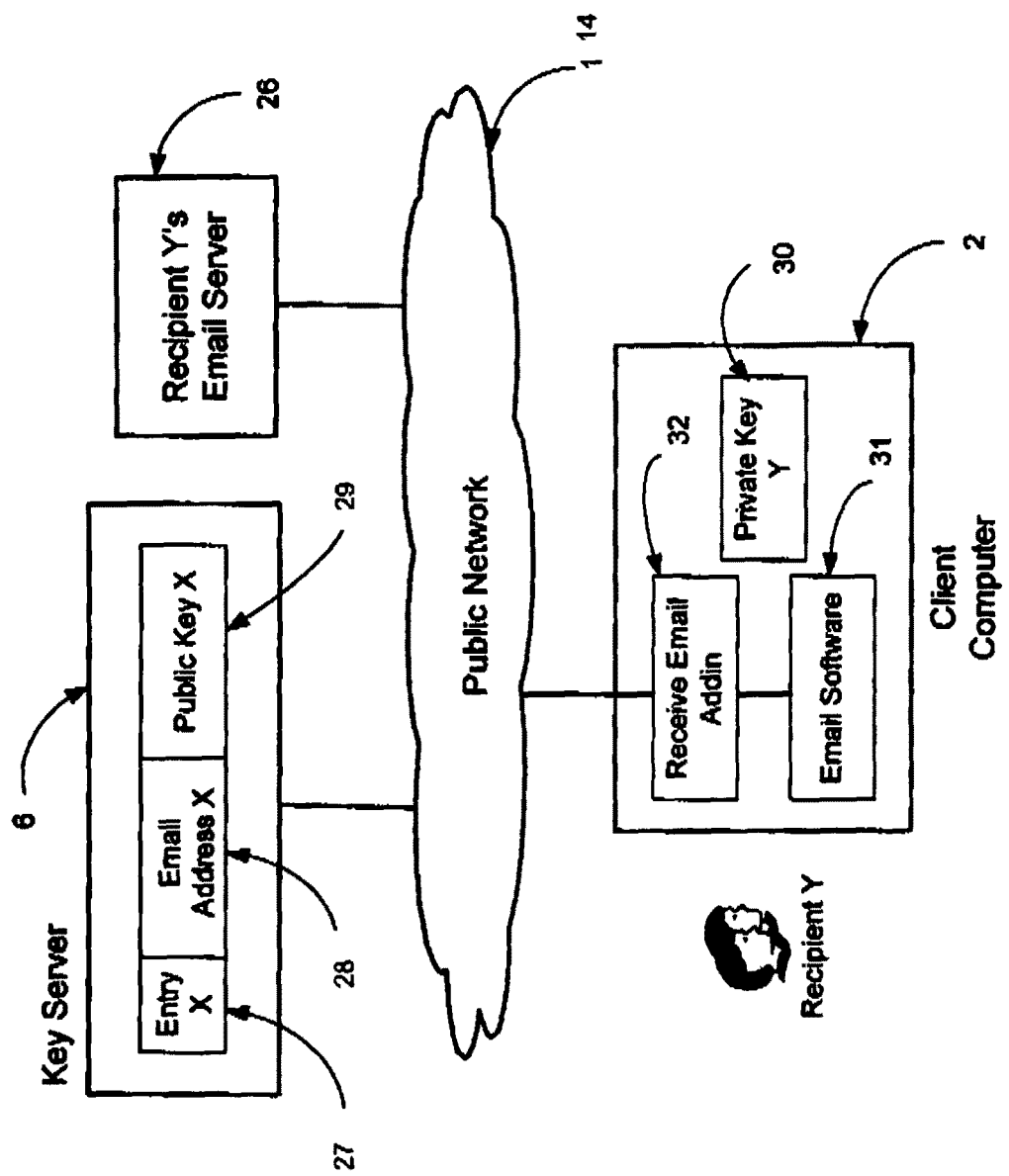
FIG. 10 shows a schematic representation of a system and method for email verification in a public network according to another embodiment of the invention.
Figure 11:
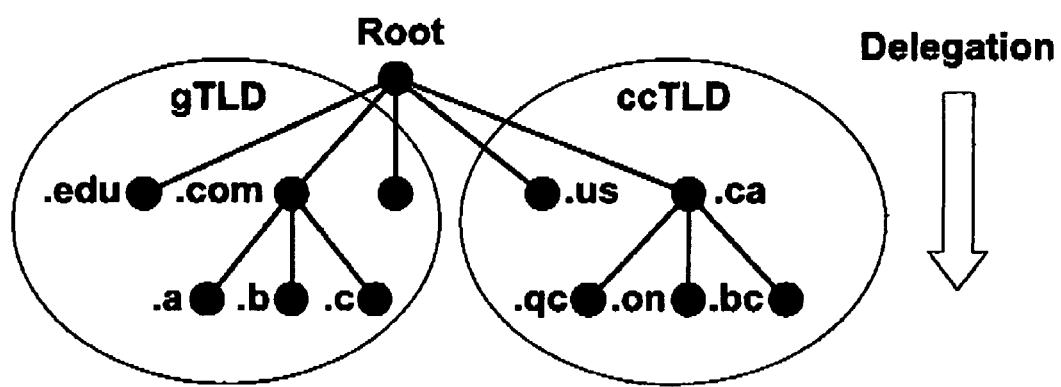
FIG. 11 represents an example of top level domain structure and delegation in an a standard internet domain name organization having a tree based hierarchy.

Referring to FIG. 10, when a user receives an encrypted email from the Recipient's Email Server 26, the Receive Mail Plug-in 32 will do the following:

Ask the user for the password to access the Private-key 30. It is up to the security policy whether this has to happen every time when a mail shall be decrypted or only the first time after the Email Software 31 has started.

Decrypt the received mail with the user's Private-key 30.

If the user wishes to verify that the e-mail was actually sent by the sender, then he could ask the Receive Mail Plug-in 32 to verify whether the signed message containing both the sender's e-mail address and recipient e-mail address is correct by retrieving the public-key 29 of the sender from the Key Server 6 and the e-mail address 28 associated with it, and decrypting the signed message using retrieved public-key 295. If e-mail addresses contained in the signed message are the same as the e-mail addresses of the sender and recipient, then it is verified that the e-mail is actually sent by die sender and the email is intended for the recipient. If a checksum is included in the signed message, then the Receive Mail Plug-in 32 can compute the checksum of the decrypted email content and compared it with the checksum derived earlier. If the two checksums are the same, then the integrity of the email content is valid. Otherwise, the user may reject die email, for example, because it could be either a Phishing attempt or a SPAM mail.

Anyone can obtain the sender's public-key 29 from Key Server 6 to decrypt and verify the checksum. Altering the mail invalidates the checksum and without sender's private-key, it is impossible to re-encrypt a new checksum. Moreover, by obtaining the recipient's public-key 25 from Key Server 6, the sender can create messages that can only be decrypted by using the recipient's private-key 30, which is known only to the recipient. In addition, by signing the email addresses of both die sender and the recipient using sender's private-key 20, the recipient could contact the Key Server 6 to obtain the sender's public-key 29 to decrypt the sign email addresses to verify that that the email is indeed sent by the sender and is intended for the recipient. Therefore, the embodiments described above provide for message confidentiality, message integrity, and authentication, all of which may be required for email to be qualified as secure email, depending on the level of security required.

While the use of a simple checksum for message integrity has been described, it will be appreciated that other known approaches for verifying message integrity may be used for this functionality.

When senders sign their email using their private-keys, it becomes practical for recipients to just say no to unsigned email, thus avoiding reception of Phishing or SPAM mails. While Phishing and Spam mail cannot be completely avoided using the systems and methods described herein, because it is possible that, e.g. spammers could anonymously obtain sender email addresses with key pairs and email client plug-ins, it is contemplated that additional methods for intercept, blocking or deferring of service to unauthorized users may become feasible when using secure email systems and methods as herein described rather than conventional open email.

Although the above described e-mail plug-ins do not replace the built-in templates for signatures in an email client software, such as Microsoft Outlook®, they should extend the functionality of email client software and improve ease of use and ease of deployment in email security applications.

If an unauthorized person has obtained the private-key associated with an email address, the owner of the email address or the owner of the email address' domain may request discontinuation of the email address and deletion of the corresponding public-key entry from the key server. Or the owner of the email address may request generation and delivery of a new private/public-key pair and the registration of the new public-key on the key server or the key servers. This may become necessary when the private-key of an email owner has been spied out by other persons. Therefore, a web-based user account would be set up in such a way that the authenticated user would be able to revoke the current public-key/private-key pair and to regenerate a new public-key/private-key pair for the user's e-mail address, if required.

Typically, if the owner of an email address domain finds out that the email address is used for spamming or that the private-key associated with that email address is published on the internet, the domain owner would notify the email address owner to request new key generation. If the email address owner does not react to this notification for a set period of time, the domain owner might discontinue the email address to avoid being blacklisted as a spamming domain. (This does not avoid tedious blacklisting to distinguish spammer-owned domains from domains with particular accounts occasionally hijacked by a spammer—as in the unencrypted email case.)

Thus registration services would provide for such requests for issue of a new key pair, with appropriate authentication from the domain owner or registered user, by deleting an existing key, issuing a new private-key to the registered user, and updating the associated public-key stored on the assigned public-key server(s).

It is possible to deliver authentication and authorization client software on a portable memory device such as a USB stick to provide secure web-based authentication and authorization service in a way of independent of computer hardware. This storage of the above software plug-in enables the offering of secure web-based authorization and authentication service in a public computer environment, such as an Internet Café or a hotel.

Furthermore, the software package delivered to the user may hold an additional program to generate external media such as USB keys, writeable disks or memory cards which hold the private-key in a secure way. After generation of the external media, the private-key can be deleted from the client computer and applications using the private-key directed to the external media. The software package delivered to the user may alternatively be delivered in a form not requiring installation, or ready to run from a removable device which can be used in any computer supporting the removable device interface and running a compatible operating system, virtual machine or emulator. Thus for example, by delivering mail client software on a portable memory device such as a USB stick, secure email service may be provided in a computer hardware independent form, facilitating use in a public computer environment.

Other optional features provided by either a mail client plug-in, or a server based mail client, provide user feedback on the security status of an email before sending it. Thus a user may make a decision about whether or not to proceed with sending the email, or make deletions or modifications to a recipient address list before sending, Optionally such feedback may be suppressed if all recipients are registered users supporting secure email.

Additionally, while the embodiments described herein show specific configurations of email software to access POP or Exchange Email servers with proper authentication, it is to be understood that different configurations of email systems such as Web-based email are contemplated. For example, for Web based mail, an applet may be applied to a web-based e-mail application in order to perform public-key look-up and message encryption on the transmitting side, and an applet to perform private-key look-up from a private store and message decryption for receiving encrypted emails. By the same token, it is to be understood that the teachings herein can be more broadly applied to other types of similar application requiring transmission and reception of secure emails.

The system and method may be used with any type of encryption algorithm or key pair type (e.g. RSA, ECC, HECC or one of many other known types of key pair), and keys of any length (for example, high security or military applications may require a longer key, while shorter keys may be adequate for general email communication), and a vendor may select their own key type.

It is also contemplated that delivery of secure e-mail client software or program module may be accomplished using a portable memory device such as a USB stick to provide access to secure e-mail service in a way of independent of computer hardware. This storage of secure e-mail software enables the offering of secure e-mail service in a public computer environment, such as an Internet Café or a hotel.

In embodiments described above, for security, private-keys are typically deleted by the registration server after the plug-in and private-public-key pair are made available to the registered user, or stored on a secure Private-key Server for access by the user. Where required by law, private-keys must be made available for law enforcement, and if keys are to be deleted from the registration server, private-keys are put into a pool, i.e. may be stored in a secure database without any association of public-keys or e-mail address or other identification, to allow for a law enforcement unit to decrypt selected e-mails under warrant, with linear effort (i.e. a known linear search of all available keys).

Public Key Distribution and Management

It is important to note that in operation of the system as described above, a very large number of requests for public-key searches per unit time in Key Server 6 from registered users would be generated. The time required to search for a public-key given the e-mail address of the user should therefore be minimized to the extent needed so that for practical purposes a user does not have to wait for an unacceptably long time for the Key Server 6 to respond to send an encrypted e-mail. Therefore an appropriate public-key search engine is needed. For this purpose, a well known approach which may be employed is the use of Hash Table that associates e-mail address with the associated public-key to accelerate the search. It works by transforming the e-mail address using a hash function into a hash, a number that the hash table uses to locate the public-key. Hash table search techniques provide constant-time look-up on average, regardless of the number of entries in the table, Distributed Server Architecture: kDNS Server Network and Protocols For simplicity, the key server 6 has been described as a single element so far, In practical applications for use with a large user population, the system and method can be extended as a redundant and distributed service to allow for better scaling and availability and for this purpose the key server, and/or registration server comprise a distributed server organization, preferably organized as a hierarchical domain structure.

Thus Key Server 6 represented in FIGS. 1 to 6 may be a server in a server network, or comprise more than one individual server, i.e. server 6 may implemented as server farms, as is conventional, wherein nodes of the server farm are optionally distributed to achieve reliability even in disaster or emergency situations. A plurality of Key Servers may located in different locations, where all the Public Searches are managed by an open and distributed hierarchical key server network for the key address resolution (kDNS), which will be referred to as a kDNS server network and kDNS protocol, as described in further detail below with reference to FIGS. 7 and 8, and FIGS. 11 to 14.

Preferably, a key server network is implemented hierarchically, with topmost hierarchies acting as directory servers which redirect public-key requests to appropriate key servers. The directory servers may redirect based on the full email address for which a public-key is requested, on the email domain, or part of the email domain.

The directory servers may form a hierarchy with the topmost directory server resolving higher level domains, and the lower directory server levels resolving subdomains or specific email addresses.

Thus a directory server responds to the request with a preliminary response indicating the key server or key server farm where the public-key will be stored if the email address exists and has a public-key associated with it, and then the requesting agent sends a second request for a public-key directly to the indicated server.

Where the key server hierarchy follows the domain name service (DNS) hierarchy, each domain owner may offer a public-key server service under a specified port for email addresses with that domain.

Where domains do not offer public-key service, existing key servers may act as delegates for those domains, i.e. analogous to domain name service (DNS).

Thus a request for a public-key for a particular email address may be requested first from the domain owner, and men from other keys servers if the first request to the domain owner fails.

When a public-key is retrieved, a key server may sign a public-key with its private-key to inhibit modification of a public-key in transmission to a requestor.

For an added level of security, it may be required that the key server requires requests to contain not only the email address for which they public-key is requests but also an email address of the requestor which itself is associated with a public-key. The key server will then encrypt the requested public-key with the public-key of the requestor, so that the requested public-key can only be retrieved with the requestors private-key.

If the queried key server does not know the public-key of the requestor, the key server may itself send a request to the key server hierarchy and receive a response encrypted with the key server's public-key.

There are two further scenarios which may also be considered:

When domain owners want to have control over the public-key infrastructure of users in their domain.

When users do not desire the service to be run by or be dependent on a single provider of public-key information.

Thus embodiments of a system and method of the present invention address these scenarios by providing the following two extensions to the key server functionality.

The first extension can be embodied based on a conventional DNS service. The send mail plug-in described above can perform a DNS look-up, based on the recipients email address, for the recipient's domain or subdomain. Having obtained the IP address of the domain server, the mail agent can send a public-key query for the recipient's email address to the domain server under a specified port. If a public-key look-up service is configured under this domain, this service will return the public-key associated with the email address in question or a response that no public-key is associated with this email address. If no public-key look-up service is configured under this domain, the requestor may give up on public-key encryption or try an alternative provider of public-key information, such as the one given below.

This second extension is embodied by using a dedicated protocol. A user with any email address domain may obtain her public/private-key pair from any provider. To make this scenario scalable and secure, a modified DNS service—called kDNS from now on—is used for key requests. In practice, this service will operate with a different port and a different protocol attribute to distinguish it from the standard DNS service. When a new key pair is generated, the provider generating the keys will look-up the key server responsible to distribute the public-keys via kDNS. If the domain of the email address of the key requestor is already known to kDNS, the key provider will store the newly generated public-key on the key server indicated by kDNS. If a public-key already exists for this email address, the storing request will fail. If storing is successful, the key server will send an email to the address for which the key was generated. The mail shall contain plain text informing the recipient about the action performed and an encrypted attachment allowing the user to check that the correct public-key was stored (i.e. by decrypting with the users private-key). The service provider remembers the public-key server and will occasionally ask the key server for the public-key the provider stored on this key server. When this key is not identical to the public-key the provider generated, further measures can be taken. The requests from provider to key server can be made through varying proxies to detect source-dependent responses. The key server remembers the provider who requested storage of the public-key. When it turns out that a particular provider is not trustworthy, all keys submitted by that provider may be frozen or deleted. Additional security measures such as the use of tunneled connections between providers and key servers may be taken to reduce the probability of requests for storage of keys which are not in the possession of the email address owner is requested.

When the domain of the email address of the key requestor is not yet known to kDNS, the provider can take up key server responsibility for the domain or can delegate this responsibility to another key server. When the domain owner has a kDNS enabled key server, the domain owner would be delegated key server responsibility for his domain.

The kDNS protocol foresees re-delegations of keys of one domain from one key server to the other. Preferably distributed server farms provide for high reliability even in disaster or emergency situations.

When a user requests key generation from a trustworthy provider, the kDNS protocol ensures that the correct public-keys are found and delivered to requestors. Caching may be used to overcome outages of a part of the kDNS server hierarchy.

Figure 7:
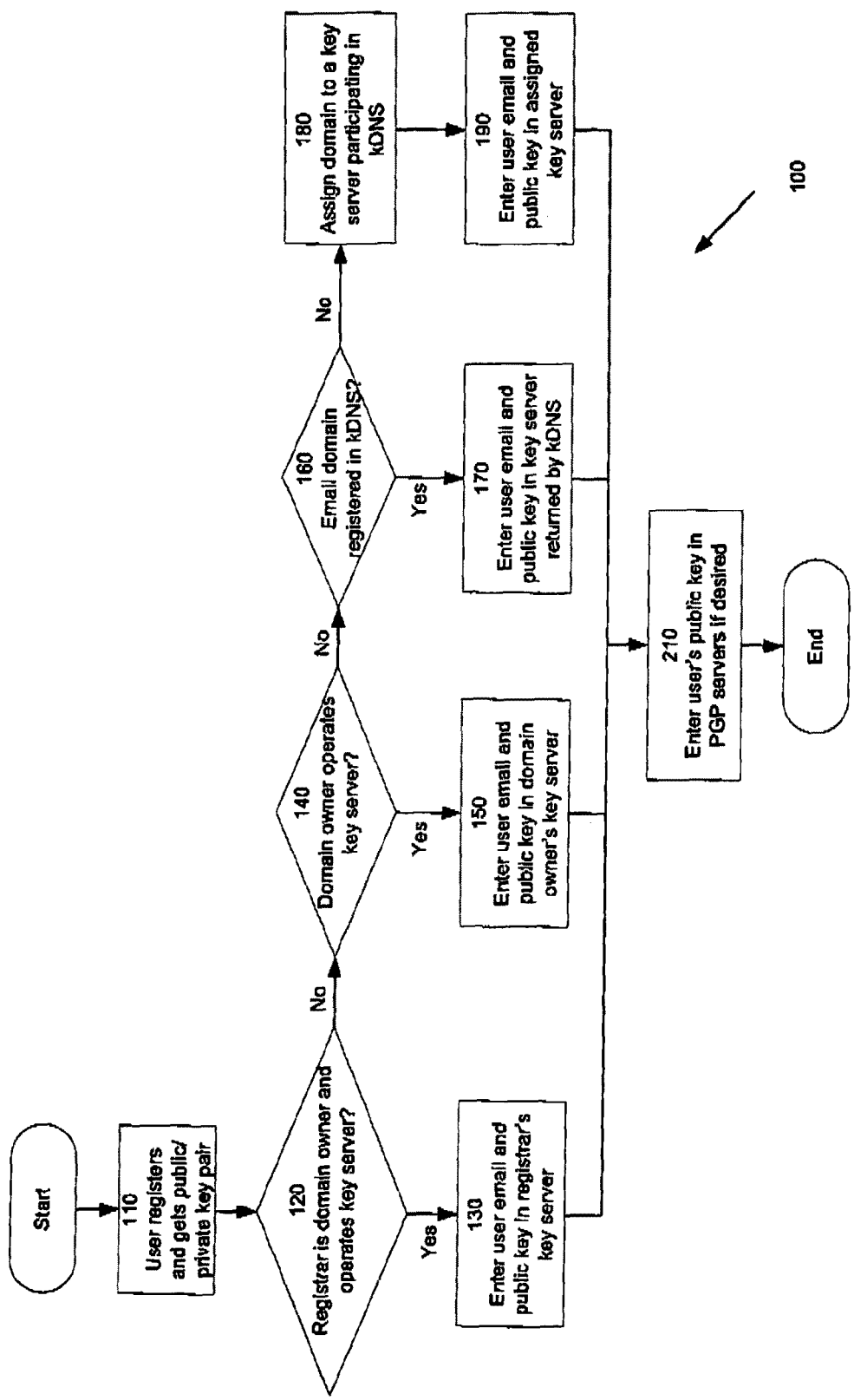
FIG. 7 shows a schematic representation of a method of distributing a public-key to a key server according to an embodiment of the invention.

More specifically, key servers as described above are used in implementing a service for key distribution and management in distributed systems. Referring to FIG. 7, which represents method 100 for registration of a new key, when a user registers with any registrar offering the service and a new key pair generated for a user having a unique identifier, step 110, the public-key of the user will be written to a key server by the following process. If the registrar owns the domain of the user's email address and operates a key server for that domain (decision in step 120), the public-key will be entered on the registrar's key server (step 130). If the registrar does not own the domain of the user's email address, but the domain owner operates a key server (decision in step 140), the public-key will be entered on the domain owner's key server (step 150). Alternatively, a query will be issued to determine if the email domain is registered in kDNS. If the kDNS protocol returns a key server which is responsible for the user's email domain (decision in step 160), the user's public-key will be entered on this key server (step 170). If no key server is responsible for the user's email domain yet (negative decision in step 160), the key serving responsibility for that domain has to be assigned to some key server (step 180) and the higher kDNS layers shall be informed. The user's public-key is then entered on the assigned key server (step 190), Optionally, if an additional publication of the user's public-key on PGP key servers is desired, the key server may also generates a certificate for inclusion in certificate stores (step 210).

Figure 8:
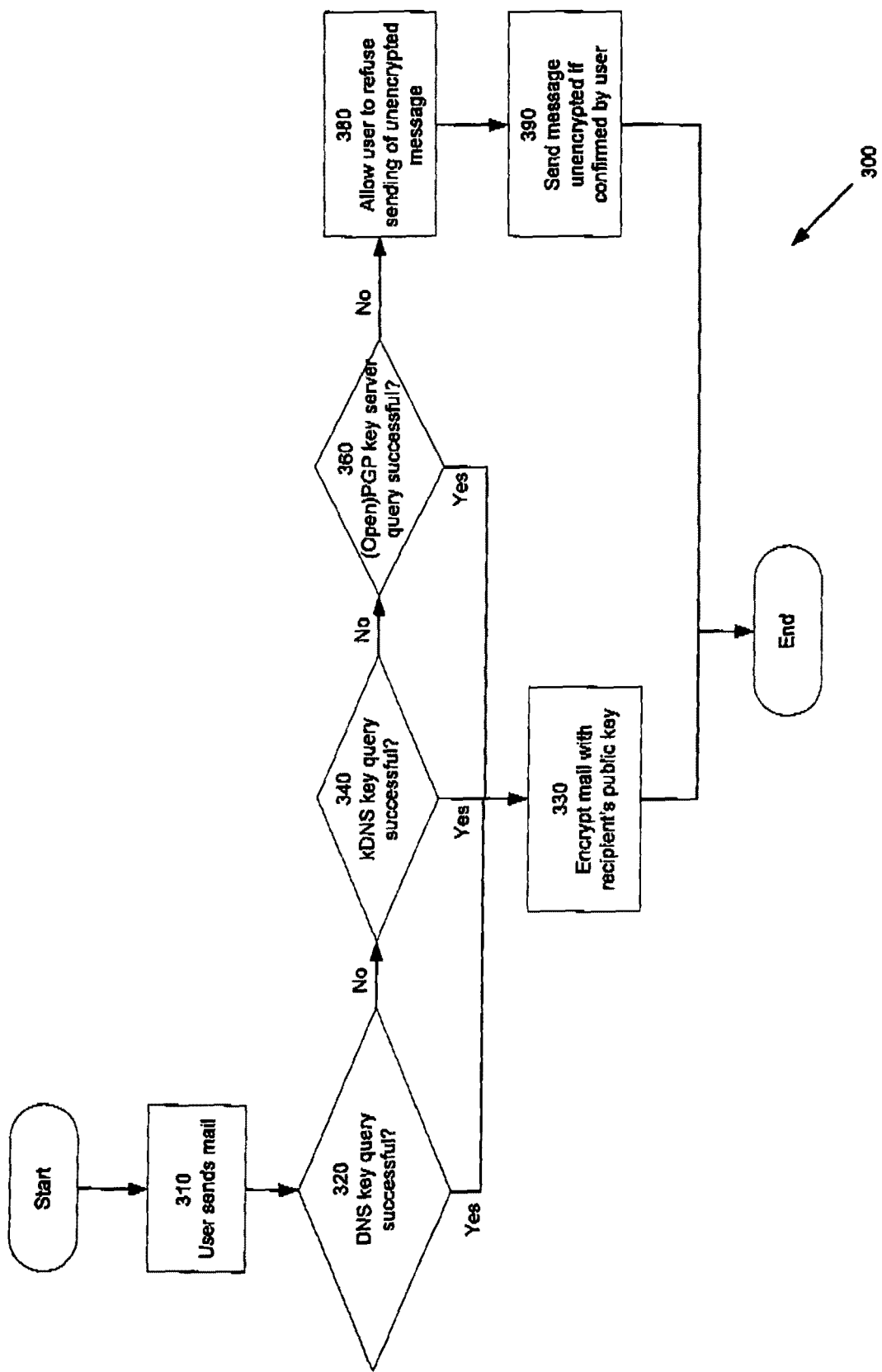
FIG. 8 shows a schematic representation of a method for look-up and retrieval of a public-key from key servers according to another embodiment of the invention.

FIG. 8 illustrates method steps for queries to key servers (key requests), associated with sending email to a recipient When the sender initiates a request for sending of email to a recipient, step 310, the security enabled send mail plug-in checks for the recipient's public-key, using a DNS based query first (step 320). If the domain owner operates a key server under the defined port and if the recipient's email address has a public-key associated with it, the recipient's public-key will be returned. The send mail plug-in will then proceed to encrypt and send the mail (step 330). If the domain owner does not operate a key server under the defined port (negative decision in step 320), the send mail plug-in uses a kDNS query to find a key server to which the recipient's email domain has been assigned (step 340). If the domain has been assigned to a key server and if the recipient's email address has a public-key associated with it, the recipient's public-key will be returned. The send mail plug-in will then proceed to encrypt and send the mail (step 330). If the kDNS based key query does not yield a result, the mail user agent may try to obtain a public-key from public or private PGP servers (step 350). If this key query returns a public-key, the mail user agent will proceed to encrypt and send the mail (step 330). If all key queries are unsuccessful, the mail shall either not be sent to this recipient, or sent unencrypted (step 390), preferably after the sender has confirmed that this is her desire (step 380). Alternatively the mail may be sent unencrypted without sender interaction if the sender has set permissions for permitted this option.

The case when a mail has several recipients may be implemented by a straightforward iteration of the process for a single recipient Sequential key queries (key requests) are performed for all intended mail recipients, and the sender may be queried whether or not to proceed with unencrypted mail transfer to those recipients for whom no key could be retrieved, as described above. A local certificate store may also be included at any point in the key query sequence.

Public-key queries may thus be directed to any combination of a local key server storing keys after a registration request a key server in a distributed key server network in the same domain or a different domain. The key server may be a kDNS key server or a key server with a standardized interface such as DNS or Open PGP, or alternatively a proprietary key server protocol, providing such a protocol is integrated into the mail user agent software module.

For applications such as email and other widespread communications services, it is desirable that key servers are made widely accessible to other users from the internet for search and retrieval of public-keys associated with email addresses or other communications addresses, preferably providing for search and retrieval of public-keys on die internet. In other applications, access to key servers may be limited to specific groups of users or account holders, or a limited user community. For some applications, key servers may be located in protected networks (e.g. in a VPN) to provide restricted access only to authorized users or a select group of users, as will be described in more detail below.

Key Server Queries Using kDNS Server Organization Having Domain Tree Based Hierarchy Based on the current domain name organization standard, top level domains may be split into generic top level domains (gTLD) such as .com, .net, et al., and country code domains (ccTLD) such as .ca, .us, et al. (FIG. 11), having subdomains .a.com, .b.com, et al.

Figure 12:
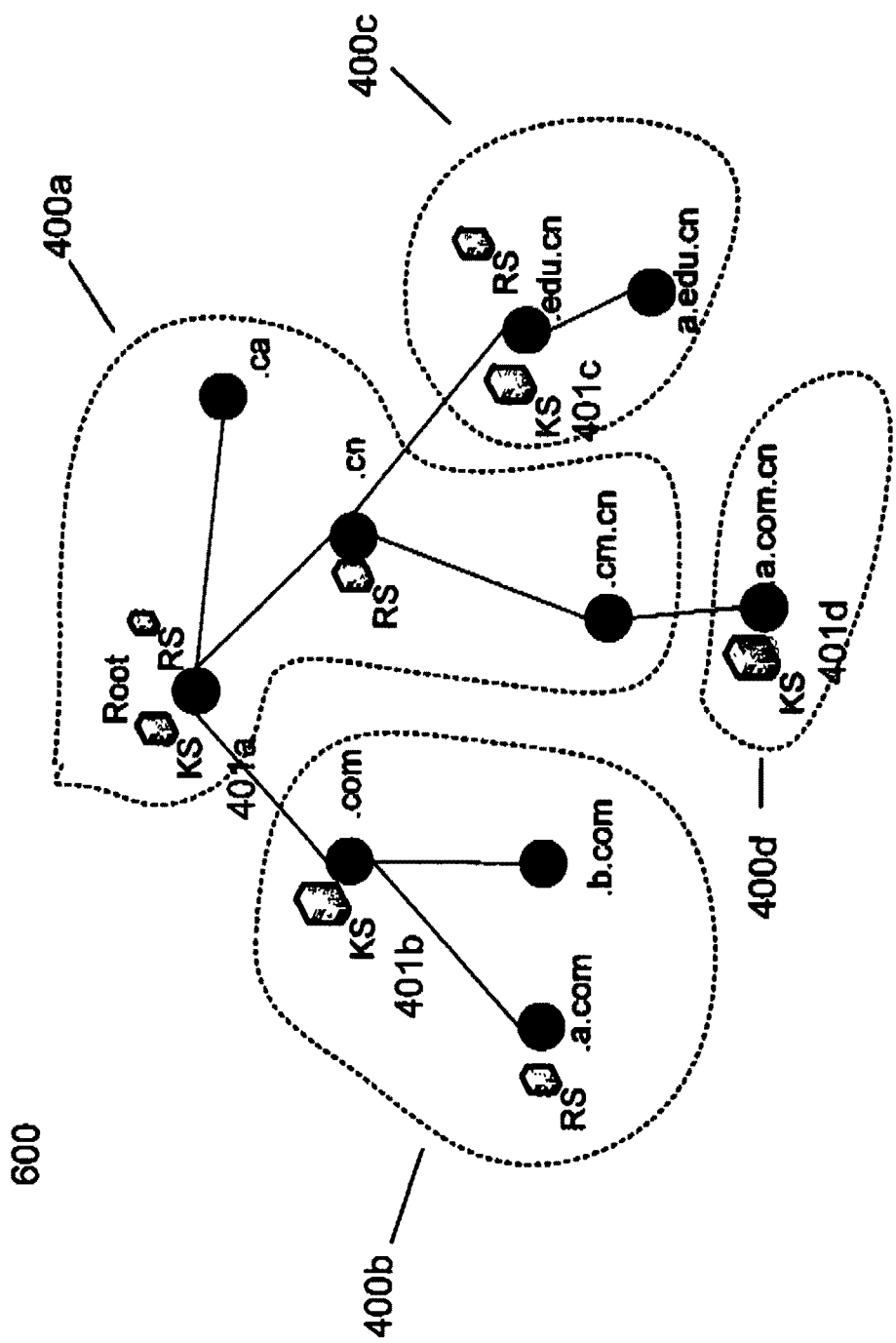
FIG. 12 shows schematically an example of key server management zones in a hierarchical domain tree network according to an embodiment of the invention.
Figure 13:
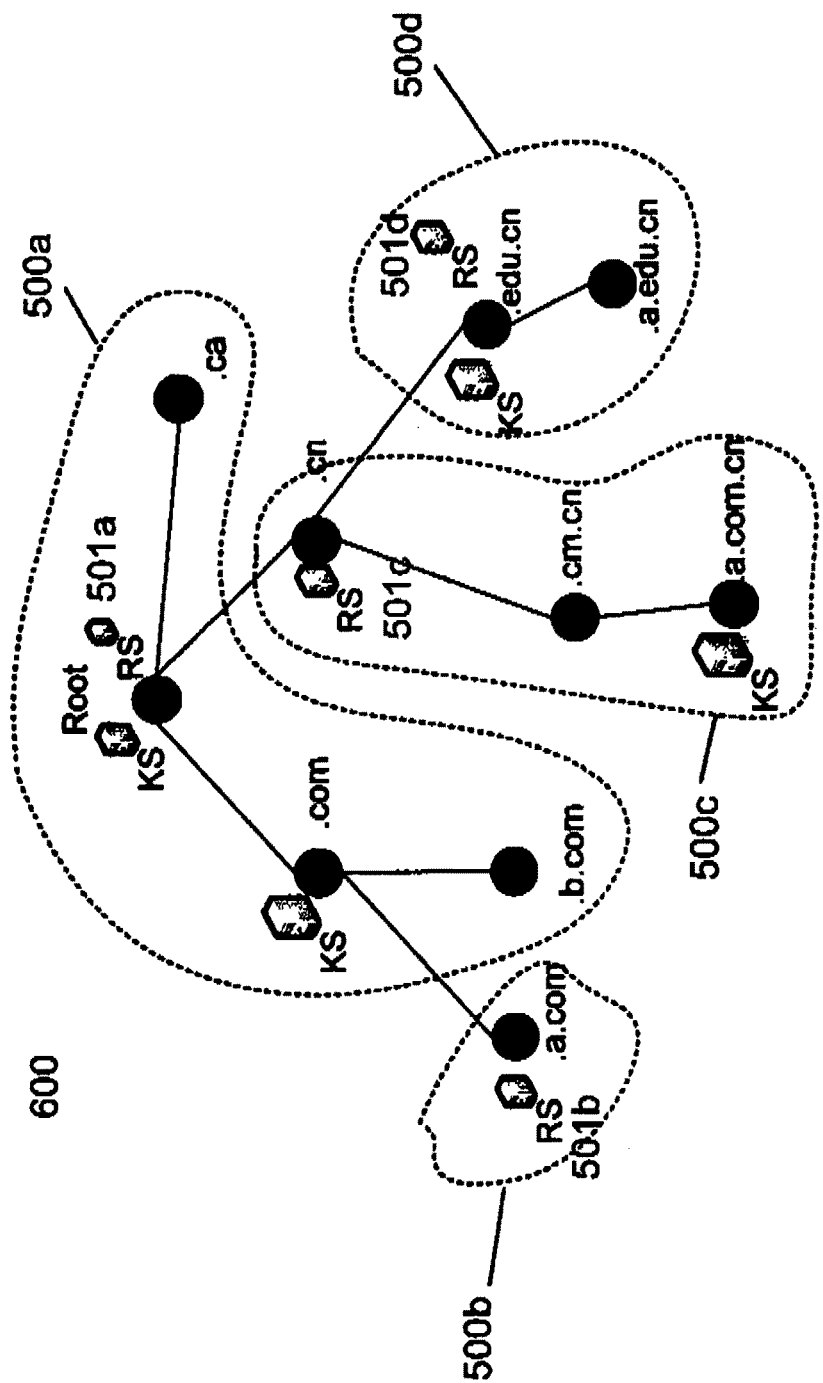
FIG. 13 shows schematically corresponding registration server management zones for the network shown in FIG. 12.

Thus, for implementation of key distribution and management for secure communications services according to embodiments of the present invention, a distributed key server organization 600 may have a similar domain tree based hierarchy. The server network 600, may comprise a plurality of registration servers RS (401a, 401b . . . ) and key servers KS (501a, 501b . . . ) within the domains, for example, as shown in FIGS. 12 and 13. Each domain is registered to only one key server or registration server, and only top domain key servers and registration servers can delegate a sub-domain key server or registration server. While some domains may include one or both of key servers and/or registration servers, it is not necessary to have both registration servers (RS) and key servers (KS) in each domain (some domains may contain neither a key server nor a registration server). Each domain can be served by one KS and one RS, but each KS and RS can provide service to more than one domain. FIG. 12 represents Key Server (KS) management zones 400a, 400b, 400c, 400d by dotted outlines, and FIG. 13 represents corresponding Registration Server (RS) management zones by dotted outlines 500a, 500b, 500c, 500d, for a server network 600 comprising 4 KS (401a, 401b. 401c, 401d) and 4 RS (501a, 501b, 501c, 501d). Each domain can be registered to only one KS and one RS. Only top domain KS or RS can delegate the sub-domain KS or RS.

Figure 14:
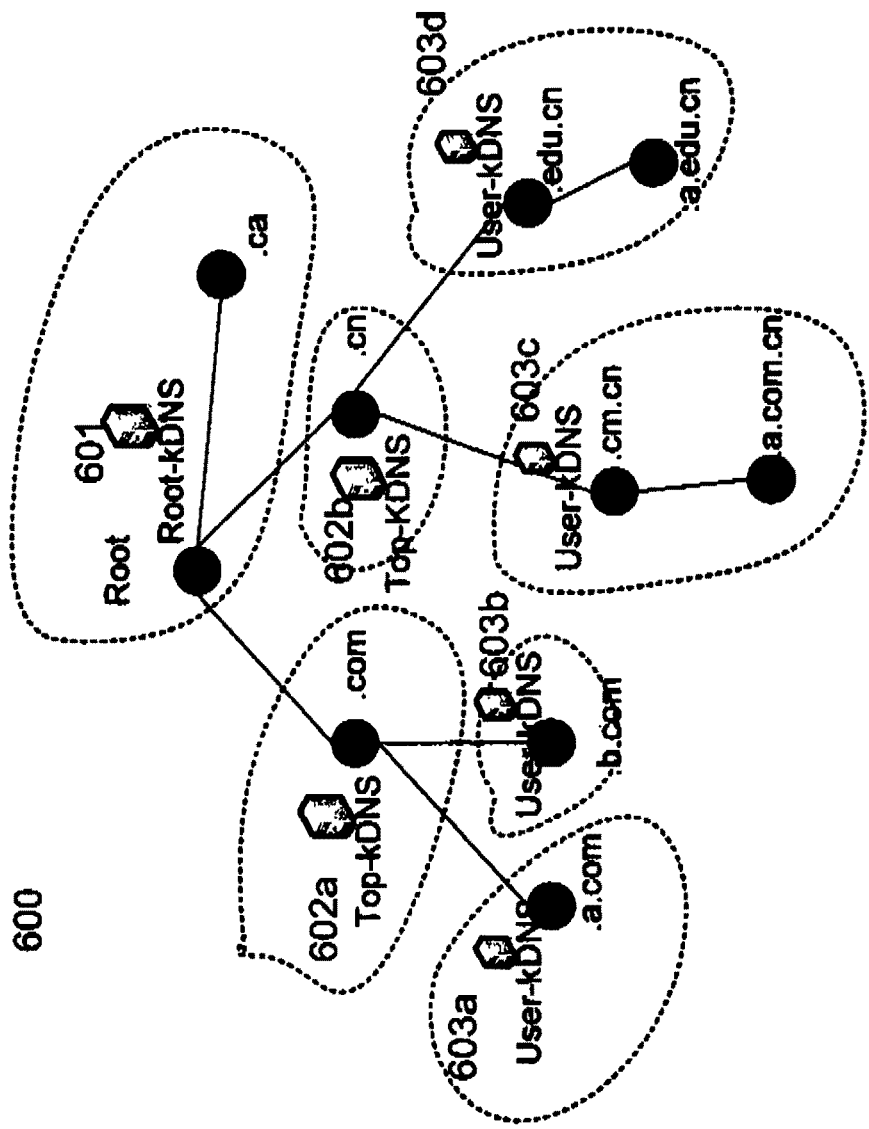
FIG. 14 shows schematically the organization of a kDNS hierarchy for domains corresponding to those shown in FIGS. 12 and 13.

FIG. 14 shows a corresponding kDNS server organization for server network 600 comprising a Root kDNS server 601, two Tbp-kDNS servers 602a and 602b, and a plurality of user-kDNS servers 603a, 603b, 603c, and 603d. (While the registration servers, key servers and kDNS servers are shown as separate network elements in FIGS. 12, 13 and 14, in other embodiments it will be appreciated that registration server, key server and kDNS functionality may be provided by a common network element, or a plurality of network elements in a network domain).

Management policies for kDNS, KS, and RS are similar to KS and RS management policies, but the three kinds of organization are independent Each domain can only belong to one kDNS server A kDNS server knows its next-low-layer kDNS servers All kDNS servers know the root-kDNS server Root-kDNS and Top-kDNS can also manage addresses of Key Servers and Registration servers.

Two basic records are needed for a kDNS system, an IP address record (A) and a Name Server Record (NS), e.g.

| IP Address Record Format | | | | |
|---|---|---|---|---|
| name | ttl class | | rr | ip |
| joe | IN | | A | 192.168.254.3 |

| Name Server Record Format | | | | |
|---|---|---|---|---|
| name | ttl class | | rr | name |
| example.com. | IN | | NS | kDNS1.example.com. |

An IP address record (A) for KS, RS and kDNS server would typically take the form as defined in RFC 1035 and forward maps a hostname (KS, RS, kDNS) to an IPv4 or IPv6 address. The only parameter is an IP address in dotted decimal format. As defined in RFC 1035, name server records may appear within the zone file in which case there are authoritative records for the name servers of a zone. Name server records may appear also, at the point of delegation for either a subdomain of the zone, or in the parent of the zone. NS RRs are required because kDNS queries respond with an authority section listing all the authoritative name servers, for subdomains or for queries to the parent zone where they are required to allow for referral to take place.

For the organization shown in FIG. 13:

The Root-kDNS has four A records:

| | |
|---|---|
| (1) kdns.com | IP1 |
| (2) kdns.cn | IP2 |
| (3) rs.ca | IP0 |
| (4) ks.ca | IP0 | and there are two NS records

| | |
|---|---|
| (1) .com | kdns.com |
| (2) .cn | kdns.cn |

At top-kDNS in .com zone (kdns.com), there are 5 A records and 2 NS records

A:

| | |
|---|---|
| root | IP-root |
| ks.com | IP3 |
| rs.com | IP0 |
| kdns.a.com | IP4 |
| kdns.b.com | IP5 |

NS:

| | |
|---|---|
| (1) .a.com | kdns.a.com |
| (2) .b.com | kdns.b.com |

Key Server Queries

To send a secure email to an email address (such as tom@example.com), the secure email client agent needs to find its responding key server i.e. KS.example.com via kDNS system, so that mail client can download the public-key corresponding to die email address. Queries can be classified into two classes (recursive and non-recursive), Recursive Queries A recursive query is one where the DNS server will fully answer the query or give an error, for example:

Mail client on a host sends query 'what is the IP address of KS.example.com' to locally configured kDNS server.

kDNS server looks up KS.example.com in local tables (its cache)—not found kDNS sends query to a root-server for die IP of KS.example.com The root-server replies with a referral to the lower layer kDNS servers for .com (L-kDNS)

The kDNS server sends query 'what is the IP address KS.example.com' to .com kDNS server (L-kDNS).

The L-kDNS server replies with a referral to the name servers for example.com

The kDNS server sends query 'what is the IP address KS.example.com' to name server for example.com.

Zone file (KS database records) defines in its own domain zone, kDNS returns A record for KS.example.com.

Transaction complete.

Iterative (Non-Recursive) Queries

An Iterative (or non-recursive) query is one where the kDNS server may provide a partial answer to the query, or give an error, for example, a simple query such as 'what is the IP address of KS.example.com' to a kDNS server which supports Iterative (non-recursive) queries but is not authoritative for example.com, a search may look like this:

Mail client on a host sends query 'what is the IP address KS.example.com' to locally configured kDNS server.

kDNS server looks up KS.example.com in local tables (its cache)—not found

The kDNS replies with a referral containing the root-servers

Mail client sends query to a root-server for the IP of KS.example.com

The root-server replies with a referral to die L-kDNS servers for .com

The Mail client sends query 'what is die IP address KS.example.com' to .com the L-kDNS server.

The L-kDNS server replies with a referral to the name servers for example.com

The Mail client sends query 'what is the IP address KS.example.com' to name server for example.com.

Zone file (KS database records) defines in its own domain zone, kDNS returns A record for KS.example.com.

Transaction complete.

As noted above, the registration servers, key servers and kDNS servers are shown as separate network elements in FIGS. 12, 13 and 14. In other embodiments (not illustrated in the figures) it will be appreciated that registration server, key server and kDNS functionalities may be provided by a common network element or a plurality of different network elements in a network domain.

In embodiments described above, the key server responds to queries to provide the public keys, and a kDNS server, or kDNS functionality associated with the key server, provides the IP address of the appropriate Key-Server when queried.

Key-DNS Architecture

Figure 15:
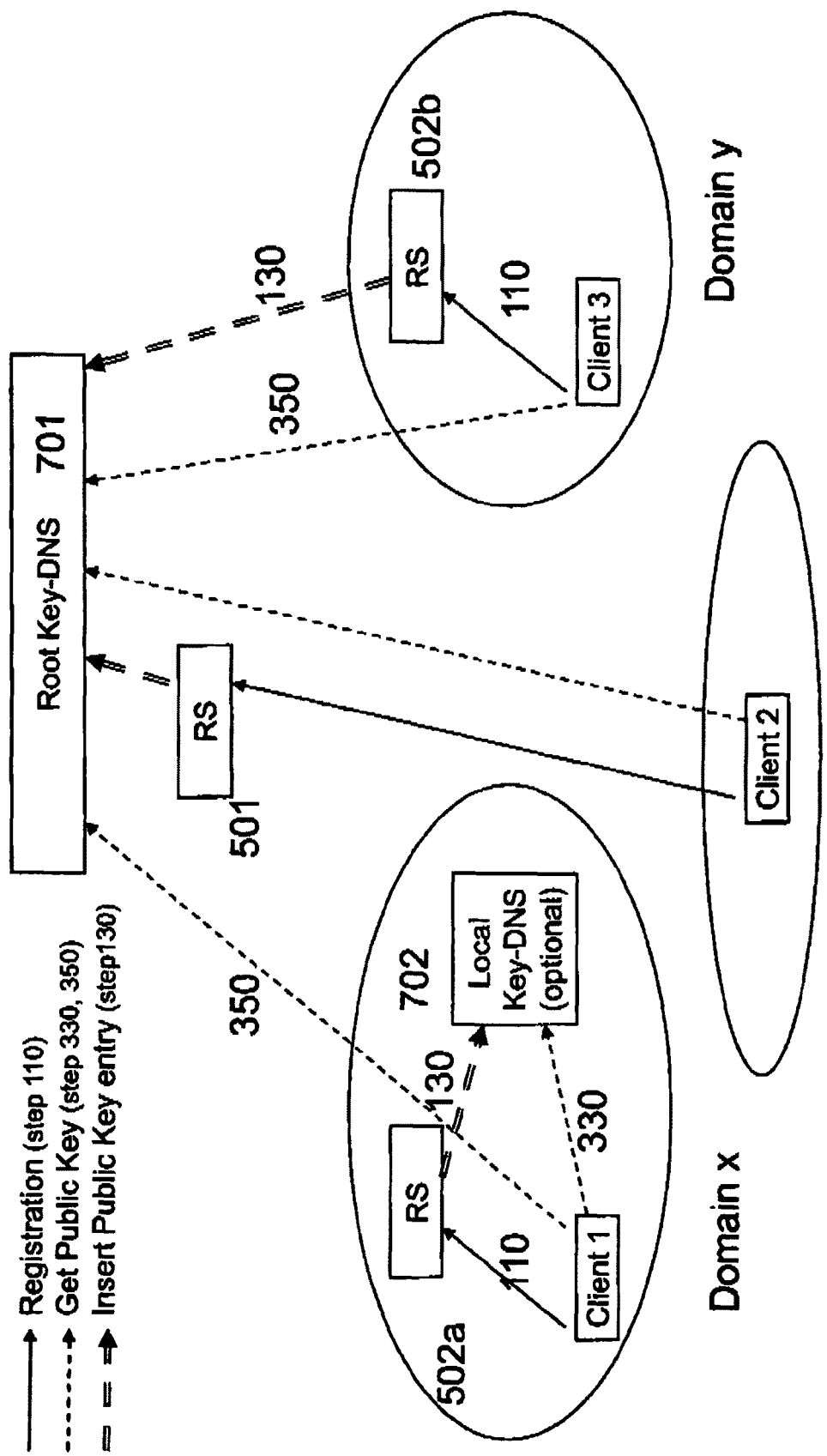
FIG. 15 shows schematically a system for secure electronic communications comprising a key-DNS server architecture according to yet another embodiment of the invention.

In other alternative embodiments, the functionality of the key-Server and kDNS-Server may be combined or integrated into one server which will be referred to as Key-DNS Server providing key-DNS service. For example, as shown in FIG. 15, a server organization is provided in the Internet comprising distributed Registration Servers (RS) and Key-DNS servers, and comprises a root domain including a root Key-DNS server 701 and a root Registration server 501. For simplicity, only three other domains are illustrated, ie. domains x, y, and z. In this example, domain x comprises its own registration server (RS) 502a and a local Key-DNS server 702a, Domain y comprises a Registration server (RS) 502b, but no Key DNS server. Domain z comprises neither a registration server nor a key DNS server.

Thus in this alternative arrangement, there are two types of servers: Key-DNS servers (Key-DNS) and Registration Servers (RS). A Key-DNS server may simply provide the public key when it is queried. However, if a requested key is not found, it will work like a DNS server when request for a public key associated with a network identity is presented. In response to the request, the Key-DNS server will traverse the Key-DNS Server hierarchy using a resolving process and the domain name associated with the network identity until the public key for the network identity is located. The resolving process typically entails iterating through several Key-DNS servers to locate public key entries associated with the network identity. A registration server (RS) will insert or delete a public key entry associated with a network identity into the Key-DNS-Server.

The Registration and Key-DNS servers are organized into one central Key-DNS Server hierarchy, which is always organized "top down" from the Root Key-DNS Server 701. All public key entries are available via the central (root) Key-DNS Server hierarchy.

There is one central Registration Server 501 for all domains which have no dedicated decentralized (i.e. local) Registration Server. Registration servers (RS) may be decentralized and be responsible for dedicated domains. Optionally, there may be dedicated local Key-DNS servers for specific domains. For example, as shown in FIG. 15, domain x has a dedicated Registration Server 502a and local Key-DNS Server 702a; domain y has dedicated Registration Server 502b but no local Key-DNS Server; and domain z has neither a dedicated Registration Server nor local Key-DNS Server.

Thus, for example a user having a Client 1 in domain x, which has its own local Registration server and Key DNS server may register his unique user id, i.e. email address, or other communication address, using Registration server 502a as described above for other embodiments (step indicated by arrow 110), and RS 402a then generates a public-private key pair, provides the user with secure access to his private key, (e.g. via an email plug in or applet for webmail), attaches the public key to the user id/network identity, and inserts a public key entry associated with a network identity into the associated local Key-DNS-Server 702a (step 130). Also as described above, the Registration server 402a may provide for public keys for this user be updated, revoked, or removed as appropriate.

The root Key-DNS server registers only the domain name of that the local domain so that a request coming from other domains knows where to look for the public key entry of a network identity registered at the corresponding local domain during the DNS domain name resolving process. When a local look-up fails, the local Key-DNS will traverse the Key-DNS Server Hierarchy or Tree using the domain name of the network identity and the DNS domain name resolving process until the appropriate Key-DNS Server has been located. Once the Key-DNS Server is located, the public key of the network identity is then retrieved. To avoid a Key-DNS Server failure, at each local domain, there may be provided secondary local Key-DNS Server. When the primary local Key-DNS Server does not respond, the client software will then communicate with the secondary Key-DNS Server. This usage of secondary Key-DNS Server to avoid failure from primary Key-DNS Server may apply to each local domain and also at the root level.

During secure communications sessions, client 1 sends requests (step 330) for public keys to the local Key-DNS server, which will return public keys for network identities stored by Key-DNS 702a, or if the key is not found, initiate the resolving process by querying the next level key-DNS server (step 350), which in this simple example is the Root key-DNS 701, to find the appropriate key-DNS server and obtain the requested public key associated with the queried network identifier as described above.

For a user having client 2, in domain y, which comprises a Registration Server, RS 502b, but no local Key DNS, registration (110) for public-private key pairs proceeds as described for client 1 in domain x. However, requests 350 for public keys associated with a network identifier are directed immediately to the key-DNS server in the next level domain, which again in this example is the Root Key-DNS 701. Accordingly, a user in Domain z, having neither a local registration server nor key DNS server must issue requests directly to the next level servers, i.e. requests (110) from client 3 for registration are sent the central (root) Registration server 501 and public key queries (350) are sent to the central (root) Key-DNS 701.

In operation, this architecture (using RS/Key-DNS) may sometimes be preferable to the alternative described with respect to FIGS. 12, 13, 14 (using RS/KS/kDNS) because die key-DNS infrastructure provides the option to provide decentralized Registration Server and Key-DNS Servers for specific domains. Thus this architecture is particularly flexible, and can be more readily implemented, by network service providers who want to have more control of their customer base. Furthermore, the number of steps in the queries and responses required to return the return the public key may be fewer, because if possible queries are handled more locally by the nearest key-DNS server, enabling more efficient implementation of key-DNS service within a domain.

By way of example, a recursive query for a public key associated with a network identity such as an email address using key-DNS may comprise the following steps:

Mail cheat on a host sends query 'what is the IP address of KS.example.com' to locally configured key-DNS server.

Key-DNS server looks up KS.example.com in local tables (its cache)—and if found, directly re turns the associated public key, and if not found key-DNS sends query to a next level or central key-DNS server for the IP of KS.example.com If found, the request is directed to the appropriate key-DNS server which performs a key look-up and replies directly with the public key associated with the requested network identifier to requesting mail client Transaction complete.

Additional Embodiments

While the embodiments described in detail above refer primarily to email communications, it will be appreciated that the methods and systems herein described may also be applied to other forms of electronic communications, such as other IP network communications, VOIP, e.g. SIP based communications. In each case, a user has a unique identifier such as a SIP URI, VOIP address, phone number, or other messaging identifier, which is registered and associated with a respective private-public-key pair to enable encryption and decryption of the associated communications using methods and systems similar to those described above with reference to an email system. Other applicable forms of messaging and communications services may, for example, include SMS, text messaging, instant messaging and video/multimedia messaging. As described for email with multiple recipients, two way or multiparty communications may similarly require key look-up for each party, e.g. a calling party and called party/parties.

Embodiments described above relate to communications services where the unique identifier of the user is associated with, or linked to, a communication address such as an email address, or IP address. For communications applications such as email described above, it is beneficial that users public-keys are made widely available, i.e. to the public, preferably on web accessible servers on the internet, i.e. key servers storing the unique identifier and the associated public-key for look-up and retrieval by any individuals wanting to send encrypted messages to a user, so that secure communications are facilitated even when the communicating parties are in different network domains and different organizations.

Nevertheless, in other applications, access to unique identifiers and associated public-keys for public-key look-up may desirably be restricted to an authorized or selected group of users, for example by restricted access through a secure link to a key server in a protected network.

For example, alternatively, the unique identifier may be another form of identifier unique to an individual or entity such as a network operator identifier, an account number, a personal identifier such as a social insurance number, or biometric data associated with an individual (fingerprint, voice print, iris scan et al.). Thus registration of a public-private-key pair linked to a unique identifier for a user having a unique identifier such as an account number provides a public-private key pair for encryption and decryption for secure communications services for banking and billing and other financial applications involving communications across multiple network domains. For example, for a banking or financial application, it would be appropriate mat access for search and retrieval of public-keys of account holders associated with individuals account numbers would be restricted only to the institution holding the accounts, to provide for secure communications over the internet between the institution and its account holders.

An example of an application for telecom billing is described in related co-pending U.S. patent application Ser. No. 60/996,239 filed Nov. 7, 2007 to the same inventors, entitled "System and method for multiparty billing of network services" in which public-keys associated with a network operator identifier are made available only to authorized users having a billing relationship, for decryption by a recipient of encrypted communications.

INDUSTRIAL APPLICABILITY

Use of systems and methods as described in die embodiments above facilitate use of secure email, other electronic communications services, by users in different organizations and domains.

By allowing for individual registration of a unique identifier and linking (attaching) of the unique identifier to an associated public-private key pair without the need of certificates, and by defining a distributed hierarchical infrastructure of key servers and kDNS servers, or key-DNS servers for public-key storage and look-up, secure email communication between users from different organizations and different domains is facilitated, and issues of scalability of existing PKI systems are addressed.

Simplification of key request, delivery and retrieval may provide the impetus for more widespread use of secure email communication that provides message confidentiality, message integrity, and authentication. Systems and methods according to this invention may therefore help to reduce the damage done by Phishing or SPAM mails to email users.

For example, when using a Web mail client which automatically encrypts and decrypts emails, registered users can enjoy secure email communication while they write and send emails almost exactly like before when unsecured (plain) email sending was the only option offered to them. When using a local mail client, registered users need only to install a plug-in to their mail client, and then can enjoy secure email communication while they write and send emails almost exactly like before when unsecured (plain) email sending was the only option offered to them.

In contrast with existing known systems, systems and methods according to embodiments of the present invention further provide for security tags as part of the message header (e.g. signing of the message in the message header) rather than only in the message body, as in conventional email encryption systems.

Moreover, the systems and methods described herein in detail with respect to email communications are more generally applicable to other forms of electronic communications, network transactions and services, particularly for users in different network domains or different organizations.

Embodiments described above provide examples of industrial applicability of aspects of this invention which involve attaching a private-public-key pair to a unique identifier associated with an address for electronic communications, such as an email, or VoIP address, or more generally to a unique identifier for other network transactions, and providing a distributed system for key distribution and management, which allows for authentication of online identities and brokering of services based on those identities, to allow for delivery of personalized, authorized applications and information.

Thus, although specific embodiments of the invention have been described in detail, it will be apparent to those of skill in the art that variations and modifications to the embodiments may be made within the scope of the following claims.

The invention claimed is:

1. A system for public-key distribution and management for a plurality of users in a communications network comprising a plurality of domains, each domain served by a Domain Name System (DNS) server hierarchy, and the system comprising:
  a distributed server network comprising a plurality of key servers organized as a hierarchical network structure (key server hierarchy) comprising a domain tree hierarchy, each domain being registered to a respective key server, and a topmost level of the key server hierarchy comprising a directory server;
  one or more registration servers for registration of users, independently of domain registration and name service by the DNS server hierarchy, each user having a unique identifier and a public-private key pair; each registration server registering to a user a respective public key of the public-private key pair of the user associated with the unique identifier of the user, and sending a key request for storing the unique identifier and the associated public key on an assigned key server of the key server hierarchy;
  the key server hierarchy storing, for each user, on an assigned key server, the respective public key of the user associated with the unique identifier for look-up and retrieval by other users; and the key server hierarchy further comprising:
  a plurality of key address resolution (kDNS) servers, each network domain being registered to a respective kDNS server, each kDNS server storing for each of a plurality of said unique identifiers, an address of a key server storing the respective public key; and
  each kDNS server responding to key requests for storage and retrieval of a public key associated with a unique identifier by:
  determining, based on the unique identifier, an address of a respective assigned key server,
  directing the key request to the respective assigned key server for resolution, or
  directing unresolved requests to a kDNS server in another domain for resolution.

2. A system according to claim 1 wherein at least one of said registration servers further performs the steps of:
  on registering a user, obtaining a public-private key pair for the user,
  associating the unique identifier of the user with the respective public key, and further to sending the key request for storing the unique identifier and the associated public key on one or more assigned key server of the key server hierarchy,
  providing the registered user with secure access to the respective private key.

3. A system according to claim 1 wherein the key server hierarchy comprises a plurality of a key DNS servers, and each key DNS server acts as the respective key server and kDNS server for a domain.

4. A system according to claim 3 wherein the plurality of key DNS servers are organized as the domain tree hierarchy, with each domain registered to a respective key DNS server, and topmost level key DNS servers acting as directory servers for redirecting key requests to traverse the key DNS server hierarchy in accordance with a hierarchical search protocol.

5. A system for public-key distribution and management for secure communications services for a plurality of users in a communications network comprising a plurality of network domains served by a Domain Name System (DNS) server hierarchy, the system comprising:
  a distributed server network comprising a plurality of key DNS servers organized as a hierarchical domain tree network structure (key DNS server hierarchy), said key DNS server hierarchy being distinct from the DNS server hierarchy, and each network domain being registered to a key DNS server;
  and at least a topmost level of the key DNS server hierarchy further comprising a registration server for registering of users, independently of domain registration and name service by the DNS server hierarchy, each user having a unique identifier and a public private-key pair; each registration server registering to a user a respective public key of the public-private key pair of the user associated with the unique identifier of the user, and sending a key request for storing the unique identifier and the associated public key on an assigned key-DNS server of the key-DNS server hierarchy;
  the key DNS server hierarchy storing, for each user, on an assigned key DNS server, the respective public key associated with the unique identifier for look-up and retrieval by another user;
  each key-DNS server being operable as a key server to respond to key requests for storing for a registered user a unique identifier and a respective public key associated with the unique identifier, and to respond to key requests for look-up and retrieval of a public key associated with a unique identifier, by returning the requested public key;

each key-DNS server further being operable for key address resolution (kDNS) comprising, when a key request for storage or retrieval of a public-key associated with a unique identifier for a user is not resolved, determining, based on the unique identifier, an address of an assigned key DNS server, for public-key storage or retrieval; and directing the key request to the assigned key DNS server.

6. A system according to claim 2 wherein for a domain, the registration server and key server are provided by a common network element.

7. A system according to claim 1 wherein in a network domain, a key DNS server comprises both said key server and kDNS server.

8. A system according to claim 2 wherein the registration server further performs the steps of: triggering generation for a user of a customized software module for a communication client containing the unique identifier, providing secure access to the private-key, and providing communication agents for public-key look-up, and encryption and decryption.

9. A system according to claim 1 wherein the server network is implemented as a distributed server farm.

10. A system according to claim 1 wherein the domain tree based hierarchy comprises one root level domain, a plurality of top level domains, and user domains.

11. A system according to claim 10 wherein each domain is registered to only one key server and one registration server, and wherein only top domain key servers and registration servers can delegate respective sub-domain key servers and registration servers.

12. A system according to claim 1 wherein the kDNS server organization hierarchy maintains name server records (NS) for a plurality of unique identifiers and IP Address records (A) for the respective associated key server storing the public key associated with each of the unique identifiers.

13. A system according to claim 5 wherein the key-DNS server organization hierarchy maintains name server records (NS) for a plurality of unique identifiers and IP Address records (A) for the respective associated key server storing the public key associated with each of the unique identifiers.

14. A system according to claim 13 providing for at least one of recursive and non-recursive searches to determine, for a specified unique identifier, an address of an assigned key server.

15. A system according to claim 1 wherein the key server hierarchy employs hash table search techniques to locate the public-key.

16. A system according to claim 1 wherein each key server signs a retrieved public-key with a private-key of the key server before sending the retrieved key to the requestor.

17. A system according to claim 1 wherein each key server comprises a standardized interface, wherein the standardized interface comprises one of DNS and Open PGP.

18. A system according to claim 2 wherein the registration server is accessible from the internet for self-registration of unique identifiers by users.

19. A system according to claim 1 wherein each registration server and key server is linked to one or more communication servers for providing communication services in one or more network domains.

20. A system according to claim 19 wherein, in a network domain, public-key request services are offered under a specified port for addresses with the domain.

21. A system according to claim 1 wherein the kDNS servers respond to a key request with a preliminary answer indicating a key server or key server farm where a public-key is stored if an unique identifier exists, and has an associated public-key, and then redirects the request to the indicated key server.

22. A system according to claim 1 wherein the kDNS servers form a hierarchy with the topmost kDNS server resolving key requests from higher level domains, and the lower kDNS server levels resolving key requests from sub-domains and specific addresses.

23. A system according to claim 1 wherein a key request is required to contain the unique identifier for which public-key lookup and retrieval is requested and also the unique identifier of the requestor, the latter also being is associated with a respective public-key, and wherein the key server encrypts the requested public-key with the public-key of the requestor before sending to the requestor, so that the requested public-key can only be retrieved with the requestors private-key.

24. A system according to claim 2 wherein the registration server further triggers generation of a certificate along with the public-private key pair, to provide for inclusion of the key in a certificate store.

25. A method for public-key distribution and management for secure electronic communication services for a plurality of users in a communication network comprising one or more domains served by a domain name system (DNS) server hierarchy, one or more registration servers for registration of users independently of domain registration and name service by the DNS server hierarchy, and a key server hierarchy comprising a plurality of key servers organized as a hierarchical network structure comprising a domain tree hierarchy, each domain being registered to a respective key server, and a topmost level of the key server hierarchy comprising a directory server, the method comprising:

registering to each user a unique identifier and attaching a respective public-key of a private-public key pair of the user;

for each user, storing on at least one assigned key server of the key server hierarchy, the unique identifier and the attached public-key for lookup and retrieval of the public-key by another user based on the unique identifier;

and storing, on a directory server of at least a top level of the key server hierarchy, each unique identifier and the address of an assigned key server storing the respective key; and responding to key requests for public-key storage or retrieval based on a respective unique identifier, by steps comprising:

querying a local key server of the key server hierarchy and resolving the request by storing or returning the requested public-key; or redirecting unsuccessful key requests to a key server in a next level of the hierarchy for resolution; or redirecting unsuccessful key requests to a directory server of the key server hierarchy for key address resolution comprising: determining the address of an assigned key server and forwarding the key request for response.

26. A method according to claim 25 wherein the step of registering further comprises: triggering generation for a user of a customized program module for a communication client containing the unique identifier, providing secure access to the private-key, and providing communication agents for public-key look-up, and encryption and decryption.

27. A method according to claim 26 employing at least one of recursive and non-recursive searches to determine, for a specified unique identifier, a corresponding key server, and thereby find the public-key associated with the specified unique identifier.

28. A method according to claim 26 employing hash table search techniques to locate the public-key.

29. A system according to claim 26 comprising signing a retrieved public-key with a private-key of the respective key server before sending the retrieved key to the requestor.

30. A method according to claim 26 comprising receiving registration requests from users from the internet for self-registration of unique identifiers by users.

31. A method according to claim 26 wherein the communications network comprises a plurality of network domains, each domain is registered to a key server in the key server hierarchy, and wherein a public-key request is directed first to a key server in a first domain, and if unsuccessful, the public key request is then directed to key servers in other domains for response.

32. A method according to claim 31 wherein a directory server responds to a request with a preliminary answer indicating a key server or key server farm where a public-key is stored if an unique identifier exists, and has an associated public-key, and then redirects the request to the indicated key server.

33. A method according to claim 26 wherein a key request is required to contain the unique identifier for which public-key lookup and retrieval is requested and also the unique identifier of the requestor, the latter also being is associated with a respective public-key, and wherein the key server encrypts the requested public-key with the public-key of the requestor before sending to the requestor, so that the requested public-key can only be retrieved with the requestors private-key.

34. A system according claim 1 wherein keys for a first domain are stored by an assigned key server in a second domain and the first domain is served by a kDNS server in a different domain, the kDNS servers performing the steps of: responding to key requests for a unique identifier from the first domain, determining based on the unique identifier an assigned key server for storing of the associated public key, and forwarding the key request to the assigned key server.

* * * * *